United States Patent [19]
Cooper et al.

[11] Patent Number: 5,682,527
[45] Date of Patent: Oct. 28, 1997

[54] METHOD AND APPARATUS FOR BLOCK-LEVEL AUDITING AND DATABASE RECOVERY IN A TRANSACTION PROCESSING SYSTEM

[75] Inventors: Thomas P. Cooper, New Brighton; Michael J. Hill, Vadnais Heights; Dennis R. Konrad, Welch; Thomas L. Nowatzki, Shoreview, all of Minn.

[73] Assignee: Unisys Corporation, Blue Bell, Pa.

[21] Appl. No.: 363,443

[22] Filed: Dec. 22, 1994

[51] Int. Cl.[6] .................................................. G06F 17/30
[52] U.S. Cl. ......................................................... 395/618
[58] Field of Search ....................................... 395/600, 618

[56] References Cited

U.S. PATENT DOCUMENTS

| | | | |
|---|---|---|---|
| 4,669,043 | 5/1987 | Kaplinsky | 395/403 |
| 4,714,996 | 12/1987 | Gladney et al. | 395/600 |
| 5,193,162 | 3/1993 | Bordsen et al. | 395/200.08 |
| 5,325,509 | 6/1994 | Lautzenheiser | 395/464 |
| 5,390,318 | 2/1995 | Ramakrishman et al. | 395/485 |
| 5,404,508 | 4/1995 | Konrad et al. | 395/600 |
| 5,561,795 | 10/1996 | Sarkar | 395/618 |

*Primary Examiner*—Wayne Amsbury
*Attorney, Agent, or Firm*—Charles A. Johnson; Mark T. Starr

[57] ABSTRACT

A transaction processing audit and recovery system is disclosed. After processing a transaction, an audit manager logs in audit records only changed blocks of data of a segment of a database. Upon failure of database backing storage, a prior copy of the database is reloaded to database backing storage that is available and a recovery manager reads the audit records and copies the changed blocks back to the database backing storage. An outboard file cache system is used in conjunction with the recovery manager to recover the database. The outboard file cache provides cache storage for segments of the database and writes non-contiguous blocks of one or more segments as directed in a single input/output request initiated from the recovery manager.

21 Claims, 19 Drawing Sheets

| | | | 194 | |
|---|---|---|---|---|
| 0 | RES. | IXP# | PATH_ID | SEGMENT FLAGS |

| | |
|---|---|
| 1 | FILE_IDENTIFIER |
| 2 | |
| 3 | FILE_RELATIVE_SEGMENT_OFFSET |
| 4 | HASH_LINK/BADPTR/NAIL_LINK |

| | | | |
|---|---|---|---|
| 5 | DATA_POINTER | FLAG ANNEX | BPID |

| | |
|---|---|
| 6 | BLOCKS_WRITTEN_TEMPLATE |
| 7 | |

| | | | | |
|---|---|---|---|---|
| 8 | HOST_ID | GROUP_ID | FILE_SESSION | HOST-SESSION |

| | |
|---|---|
| 9 | LEG1_DISK_NUMBER |
| 10 | LEG2_DISK_NUMBER |
| 11 | LEG1_DISK_ADDRESS |
| 12 | LEG2_DISK_ADDRESS |
| 13 | UNUSED |
| 14 | |
| 15 | PROGRAM_ID |

FIG.11

BLOCK-LEVEL SCATTER WRITE COMMAND PACKET

| | 0 | 3 | 4 | 5 | 6 | 10 | 11 | 12 | 17 | 18 | 19 | 21 | 22 | 23 | 24 | 29 | 30 | 35 |
|---|---|---|---|---|---|---|---|---|---|---|---|---|---|---|---|---|---|---|
| 0 | WORD_COUNT | | | | | | | | | DC | DAC | | | | RESERVED | | | |
| 1 | ADDRESS |
| 2 | NEXT_COMMAND_PACKET |
| 3 | RES | | CCF | LENGTH | | | | | | | | BLOCK_COUNT | | | COMMAND_CODE | | | |
| 4 | RES | | | | HOST_ID |
| 5 | RES | | H |
| 6 | FILE_RELATIVE_SEGMENT_OFFSET |
| 7 | RES | | FF | RR | XF | RESERVED | | | | | | | | | SRBO | | SEG_CNT | |
| 8 | BLOCK NOT WRITTEN TABLE |
| ⋮ | |
| n | |

|   | 0 | 3 | 4 | | 35 |
|---|---|---|---|---|---|
| 0 | RES | | | BLOCKS_NOT_WRITTEN_TEMPLATE | |
| 1 | RES | | | | |

BLOCK-LEVEL SCATTER WRITE STATUS PACKET

| | 0 3 | 4 5 | 6 11 12 | 17 18 | 23 24 | 29 30 | 35 |
|---|---|---|---|---|---|---|---|
| 0 | VALID_FLG | | RESERVED | | UPI_NUMBER | | |
| 1 | RES | | | PROGRAM_ID | | | |
| 2 | COMMAND_PACKET_ADDRESS | | | | | | |
| 3 | HARDWARE_DEPENDENT_STATUS_1 | | | | | | |
| 4 | HARDWARE_DEPENDENT_STATUS_2 | | | | | | |
| 5 | RECOMMENDED_ACTION | | | REASON | COUNT | FLAGS | |
| 6 | STATISTICS | | | | | | |
| 7 | RESEND_TIME | | | RESERVED | DESTAGE_REQUEST_PACKET_COUNT | | |
| 8 | RESERVED | | | SEGMENT_MISS_TEMPLATE | | | |
| 9 | RESERVED | | | | | | |
| 10 | RESERVED | | | | | | |
| 11<br>34 | DESTAGE REQUEST TABLE | | | | | | |
| 35<br>119 | RESERVED | | | | | | |
| 120<br>127 | | | | | | | |

200

METHOD AND APPARATUS FOR BLOCK-LEVEL AUDITING AND DATABASE RECOVERY IN A TRANSACTION PROCESSING SYSTEM

CROSS-REFERENCE TO CO-PENDING PATENT APPLICATIONS

This patent application is related to co-pending patent application Ser. No. 08/174,750, entitled, "Outboard File Cache System" which was filed on Dec. 23, 1993 and is assigned to Unisys Corporation, the assignee of the present invention now pending. U.S. patent application Ser. No. 08/174,750 is incorporated herein by reference.

BACKGROUND

1. Field of the Invention

This invention generally relates to transaction processing systems and more particularly relates to transaction logging and database recovery for transaction processing systems.

2. Description of the Prior Art

Databases have played a critical role in business areas such as banking and airline reservations for quite some time. These two lines of business illustrate how critical availability of a database can be. If a bank cannot process customer transactions (deposits, payments, transfers, etc.) because of a computer system failure or a disk failure, a customer may be unable to accomplish its business. Likewise, if an airline is unable to book reservations, customers may be lost and its planes may fly empty. Therefore, database availability is critical to some businesses.

While great strides have been made toward providing fault tolerant computer systems, some components am still subject to failure. Therefore an efficient database recovery strategy must be in place to minimize the time that transactions cannot be processed against the database. As illustrated with the airline reservation system, if the database recovery process takes too long, the delay may result in passengers taking their business to another airline. Thus, the recovery strategy must be efficient to minimize the time that the database is unavailable.

One factor that influences the efficiency of recovery processing is the transaction specific information that is selected to be logged to an audit file. The audit file allows the database to be reconstructed in the event of a system failure. Information that is related to an update made to a database is one component of transaction specific information that is logged to the audit file. If a system failure occurs before a database update is written to disk storage and the user thinks the transaction has completed, the database update logged in the audit file must be applied to the database stored on the disk to recover the database.

Two approaches for logging database update information include segment-level logging and word-level logging. Segment-level logging involves writing a segment of the database file to the audit file when a database update results in a change in the segment. For the purposes of this discussion, a segment is the unit of storage allocated by a file management system for the database file. A segment is typically quite large, and in the case of the file management system for the OS2200 operating system from Unisys Corporation, a segment typically contains 1792 words or a multiple thereof.

For high volume transaction processing applications, the segment-level logging approach results in a very large amount of data being logged to the audit file. The practical effect is an audit file stored on many magnetic tapes. In many cases, only a small portion of the segment logged to the audit file contains updated database information; the remainder was unaffected by the transaction. Thus, a large amount of data may have been unnecessarily logged.

Segment-level logging may have adverse affects on recovery processing. Because of the large size of the audit file, much time may be spent reading data from the audit file. In addition, the segments of the database file stored on the disk must be updated with the segments read from the audit file. Writing entire segments to disk requires a substantial amount of time for data transfer wherein much of the data is unnecessarily restored.

Word-level logging addresses some of the drawbacks of segment-level logging, however, it too has drawbacks. Word-level logging involves only logging the words of the database that have changed as a result of a transaction. This saves on the amount of data logged by not logging unnecessary information. One drawback of word-level logging is an increase in recovery time.

Recovery time under word-level logging is increased because the updated words that are read from the audit file must be feathered into the proper location in the database file stored on disk. The process of updating the database file involves reading the relevant portions of the database file from the disk, writing the words to the proper locations in memory, and then writing the portions of the database back to disk.

With the increased reliance on transaction processing systems and an ever increasing volume of transactions processed, efficient audit and recovery processing is a must. As more transactions are processed by a system, there will naturally be an increase in the quantity of information that must be audited and potentially recovered.

SUMMARY OF THE INVENTION

Therefore, it would be desirable and it is an object of the invention in a transaction processing audit and recovery system to reduce the amount of data logged during audit processing and decrease the time required to recover a database.

It is an object of the invention to log in an audit file only blocks of data, within a segment of a database, that have changed as a result of processing a transaction.

A further object is to recover a database after a system or disk failure by reading audit records that contain only changed blocks and copying the changed blocks to appropriate segments of the database without incurring increased recovery time.

Another object is to cache the database in an outboard file cache and recover the database using the outboard file cache.

Yet another object is to automatically determine whether the outboard file cache is available and use the outboard file cache for recovery if it is available. If the outboard file cache is not available, the database is recovered without the outboard file cache.

A further object of the invention is to recover a database using the outboard file cache and to recover multiple segments of the database with a single input/output request to the outboard file cache.

Another object of the invention is to reduce audit processing so that the audit medium is not running at its full capacity. That is, in a system that is already limited in transaction processing throughput by the audit medium, any reduction in the amount of data being logged will result in an increase in processing throughput. By logging only the changed blocks of a database update, a reduction in audit data is achieved without severely impacting database recovery time.

The foregoing and other objects are attained in a transaction processing system operating on a data processing system. The transaction processing system includes a audit manager to log database updates to an audit file. Generally, the audit manager does not log an entire after-look segment of the database after a transaction has been processed, where a segment is the unit of storage allocated by the file management system of the data processing system. Nor does the audit manager log only the changed words within a segment. Rather, the audit manager logically divides the after-look segment into a plurality of blocks and logs only those blocks of the after-look segment that are different from blocks of the before-look segment. Thus, an intermediate level of logging, i.e., a level of logging that is smaller than a segment and larger than a single word, occurs.

The transaction processing system further includes a recovery manager that recovers the database in the event of a failure of the data processing system. The recovery manager reads the audit records from the audit file and updates the database according to the changed blocks that are contained in the audit records.

An outboard file cache is coupled to the data processing system and is used by both the audit manger and the recovery manager. The outboard file cache provides file-based cache storage of segments of the database during transaction processing. The audit manager uses the outboard file cache to obtain a before-look segment. If the before-look segment is present in cache storage, it is compared to the after-look segment to identify the blocks within the after-look segment that have been updated as a result of processing a transaction. The audit manager then logs the changed blocks of the after-look segment to an audit record in the audit file. If the before-look segment is not in the cache, the audit manager logs the entire after-look segment to the audit file.

The recovery manager uses the outboard file cache to recover the database. The outboard file cache is capable of writing physically non-contiguous blocks of a segment with a single input/output request. In addition, the outboard file cache is capable of writing physically non-contiguous blocks of multiple segments with a single input/output request. The recovery manager reads audit records from the audit file and assembles the changed blocks in an input/output request that is issued to the outboard file cache. The outboard file cache responds by writing the designated blocks to segments in cache storage or issues a cache-miss signal. If a cache-miss signal is issued, the disk number of the database backing store is determined and the disk number is transferred with the designated blocks to the outboard file cache. The outboard file cache notes which blocks in its storage contain valid data and which blocks do not contain data. At a later time, when the outboard file cache receives a read request or determines that data should be destaged to the database backing store, the blocks of the outboard file cache that do not contain data are read from the database backing store and merged with the blocks from the outboard file cache.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 11 shows the information contained in a File Descriptor;

FIG. 12 shows the format of a Block-level Scatter Write Command Packet;

FIG. 13 shows the format of an entry in the Blocks Not Written Table in the Block-level Scatter Write Command Packet;

FIG. 14 shows the format of a Block-level Scatter Write Status Packet; and

DETAILED DESCRIPTION

Figure 1:
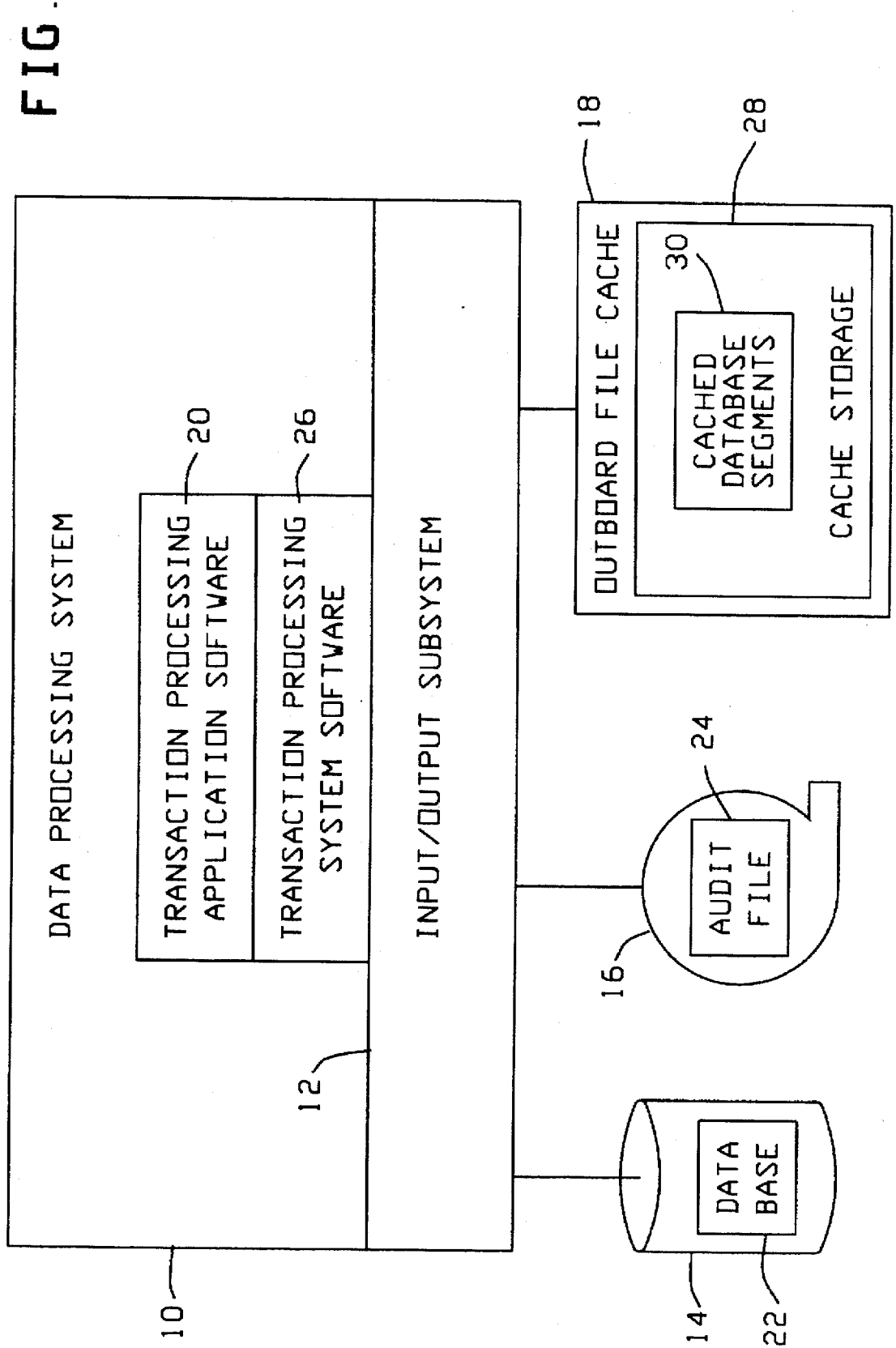
FIG. 1 is a block diagram of a data processing environment in which the present invention could be used.

FIG. 1 is a block diagram of a data processing environment in which the present invention could be used. A Data Processing System 10 provides general purpose data processing services. An exemplary system is the 2200/900 Series data processing system available from Unisys Corporation. The Data Processing System 10 includes an Input/Output (I/O) Subsystem 12 for providing access to peripheral input/output devices. The I/O Subsystem includes the hardware and software required to transfer data between the Data Processing System and the Disk Subsystem 12, the Tape Subsystem 16, and the Outboard File Cache 18.

Transaction Processing Application software 20 executes on the Data Processing System 10. An example application is an airline reservation system in which the Application 20 processes reservation requests (transactions) against a Database 22 stored on the Disk 14. An Audit File 24 is maintained by the Transaction Processing System software 26 to log updates made to the Database 22. The Audit File enables reconstruction of the Database in the event of a failure of the Data Processing System.

Outboard File Cache 18 provides cache storage for files accessible to the Data Processing System 10 and provides resiliency against data loss which is comparable to Disk 14. The Outboard File Cache contains logic for managing Cache Storage 28 and transferring data to and from the Data Processing System. It should be understood that the Cache Storage 28 complements the main storage and processor caches of the Data Processing System.

The portion of the Database 22 that is cached in the Outboard File Cache 18 is shown as block 30. The Outboard File Cache at this level of the storage hierarchy allows references to cached files to be immediately directed to the Outboard File Cache for processing, in contrast with a non-cached file where an I/O channel program must be constructed to access the proper Disk 14 and the request and data must flow through a possibly lengthy data path and incur delays typical for disk storage systems.

The processing involved in gaining access to a Database 22 in an environment with an Outboard File Cache 18 may be described as follows. The Transaction Processing Application software 20 requests access to the Database. The access request may involve either reading data from or writing data to the Database.

A file access command in the form of a Command Packet is sent to the Outboard File Cache 18. Included in the Command Packet are a file identifier which specifies the file on which the operation is to be performed, an offset from the beginning of the file which specifies precisely where in the file the operation is to be performed, and the quantity of data which is to be read from or written to the file. The Outboard File Cache determines whether the referenced data is present in the Outboard File Cache based on the file identifier, offset, and quantity.

If the referenced data is not in the Outboard File Cache 18, the specified data is staged from the Disk 14 to the Outboard File Cache. Staging the data involves reading the required data from Disk and then storing the data in the Outboard File Cache. Subsequent references to the staged data normally will not result in a miss, and the data can be accessed in the Outboard File Cache. If the referenced data is in Outboard File Cache, access is granted to the referenced data.

Figure 2:
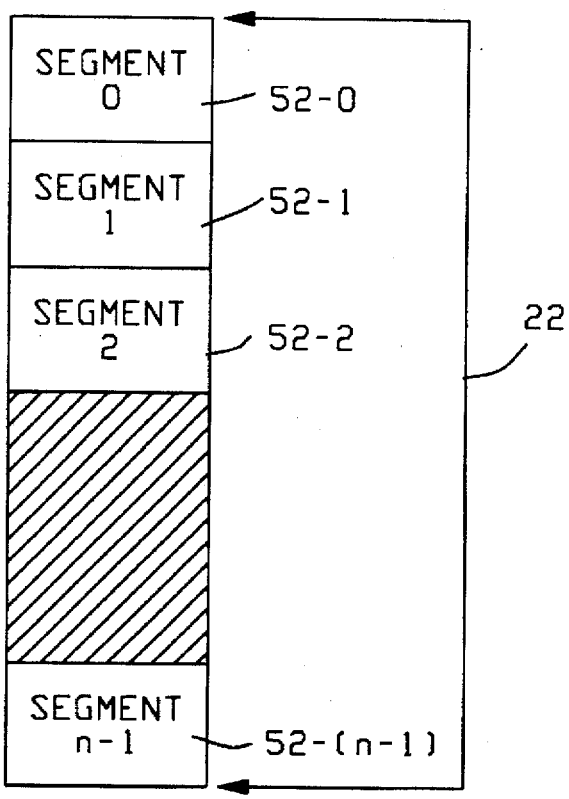
FIG. 2 illustrates the logical view of a file.

FIG. 2 illustrates the logical view of a file. The Database 22 is itself a file and from the perspective of file management functionality within the Data Processing System 10, the Database is viewed as a set of files. Therefore, the file illustrated in FIG. 2 is hereinafter referred to as the Database 22. The Database is organized in Segments 52-0, 52-1, 52-2, . . . , 52-n, wherein each Segment contains 1792 words. The number of Segments in the Database varies according to the size of the Database. A segment has the same logical format as a logical track, which is the basic unit of storage allocation in the 2200/900 file system. In addition, for efficiency the Outboard File Cache 18 manages its storage on a per-segment basis.

Figure 3:
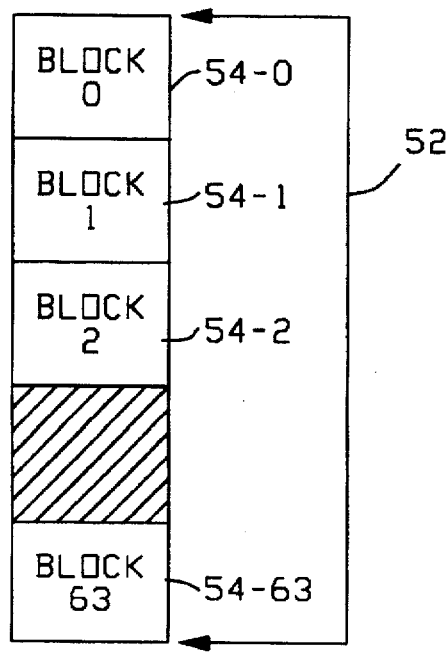
FIG. 3 shows the logical organization of a single Segment.

FIG. 3 shows the logical organization of a single Segment 52. Each Segment contains 64 blocks, numbered consecutively from 0 to 63 and respectively referenced 54-0, 54-1, 54-2, . . . , 54-63. Each block is comprised of 28 words.

Figure 4:
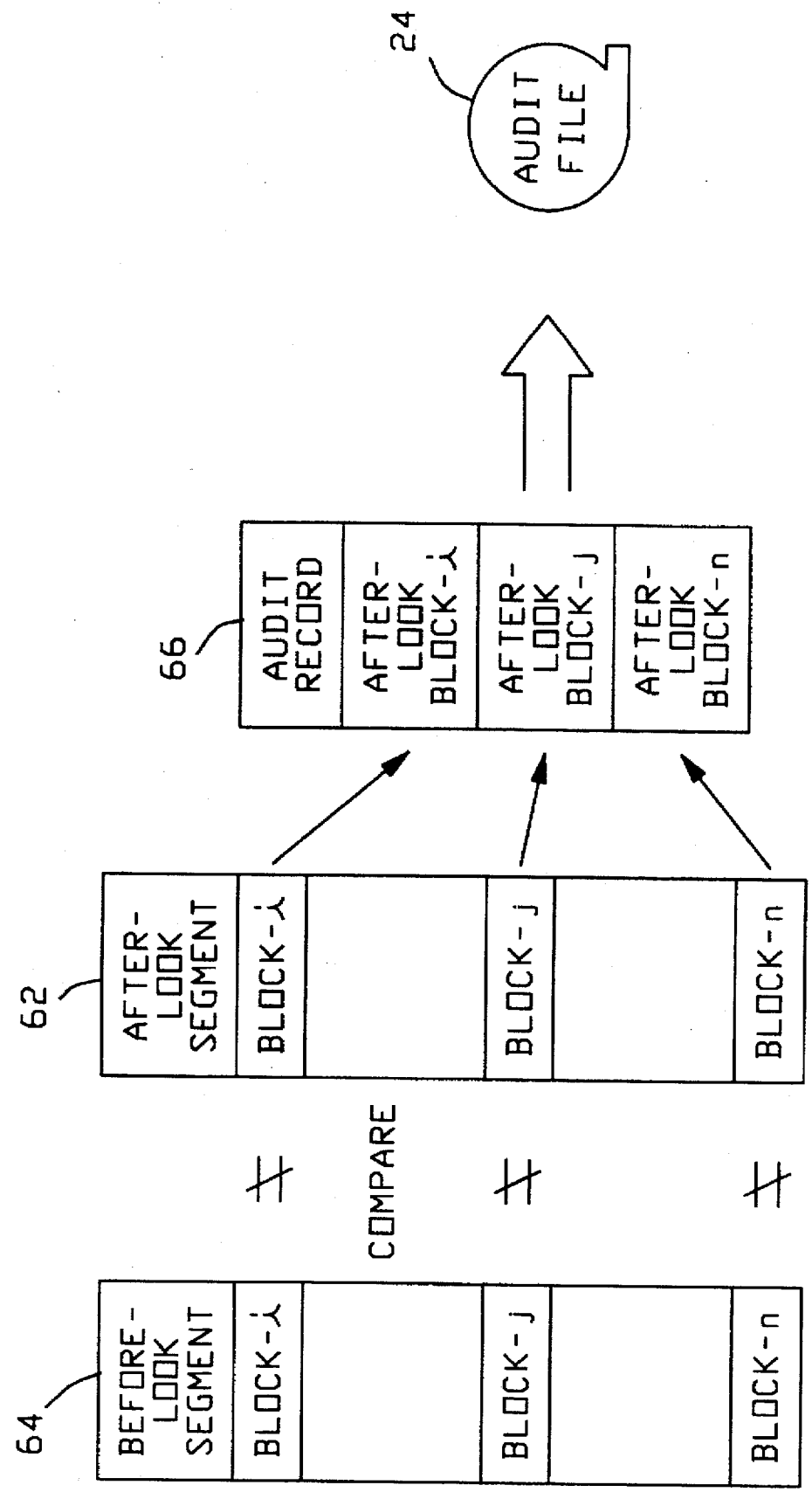
FIG. 4 illustrates audit processing performed in accordance with the present invention.

FIG. 4 illustrates audit processing performed in accordance with the present invention. Overall audit processing is performed by the Transaction Processing System software 26. Part of audit processing includes the saving of Database 22 update information to the Audit File 24. The Database update information of interest in the present invention is the portion of the Database that was updated.

The After-look Segment 62 is a Segment 52 of the Database 22 that was updated as a result of a transaction t.

In particular, transaction t resulted in the modification of Block-i, Block-j, and Block-n of the Segment. The Before-look Segment 64 is the same logical Segment of the Database as the After-look Segment, wherein the data within the Before-look Segment 64 is the data before the Segment of the Database was modified by transaction t.

The Before-look Segment 64 is compared to the After-look Segment 62 to identify which Blocks within the Segment 52 of the Database 22 were modified by transaction t. Blocks i, j, and n are identified as having been updated, and After-look Block-i, After-look Block-j, and After-look Block-n are stored in an Audit Record 66. The Audit Record 66 is then written to the Audit File 24. By only storing the changed Blocks belonging to a Segment rather than an entire After-look Segment, the quantity of data stored in the Audit File may be greatly decreased. The decrease in the quantity of audit data increases transaction processing throughput by having to spend less time writing audit data, and reduces the number of tapes required for the Audit File. If the Data Processing System or Disk 14 fails such that the After-look Segment 62 is not present, the Audit Record 66 that was written to the Audit File 24 may be used to reconstruct the Database 22 on the Disk 14.

Figure 5:
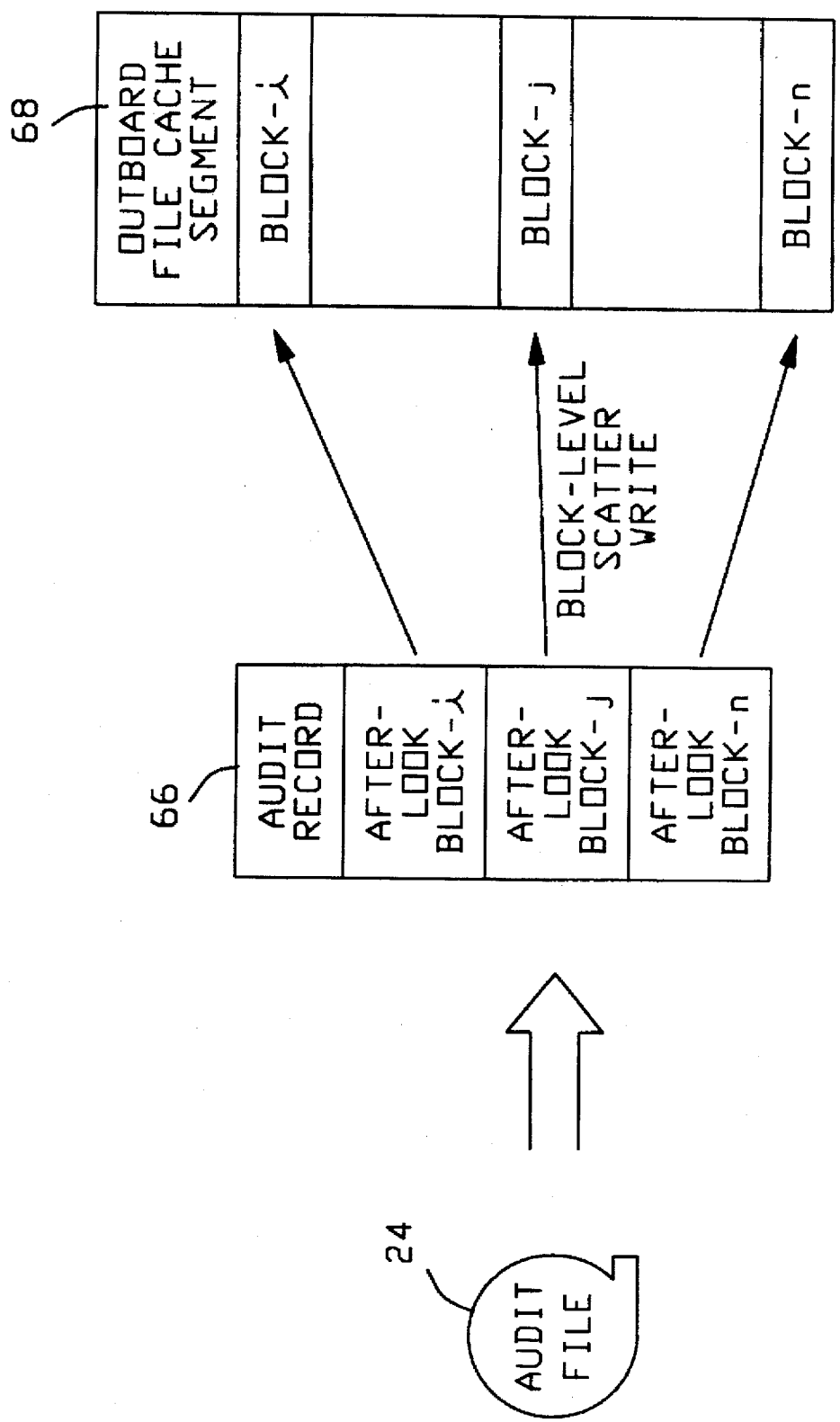
FIG. 5 illustrates recovery processing performed in accordance with the present invention.

FIG. 5 illustrates recovery processing performed in accordance with the present invention. If the Data Processing System fails before the After-look Segment 62 is written to the Database 22 on the Disk 14, or Disk 14 fails, the recovery processing function of the Transaction Processing System software 26 reads Audit Records 66 from the Audit File 24 to reconstruct the Database 22. To decrease the time required to reconstruct a Database, the Outboard File Cache 18 is advantageously used. The advantage of the Outboard File Cache is that it provides segment-level access to the Database for maximum Disk input/output efficiency, and block-level access during recovery processing without incurring extra overhead processing in having to feather the changed blocks into the Database.

An Audit Record 66 is read from the Audit File 24. As explained above, the Audit Record contains only those Blocks within the Segment 52 that were changed as a result of the transaction t. Overall recovery time is reduced by usage of the Block-level Scatter Write command that is provided by the Outboard File Cache 18. The Block-level Scatter Write command allows multiple non-contiguous Blocks to be written to a Segment stored in the Outboard File Cache.

Figure 6:
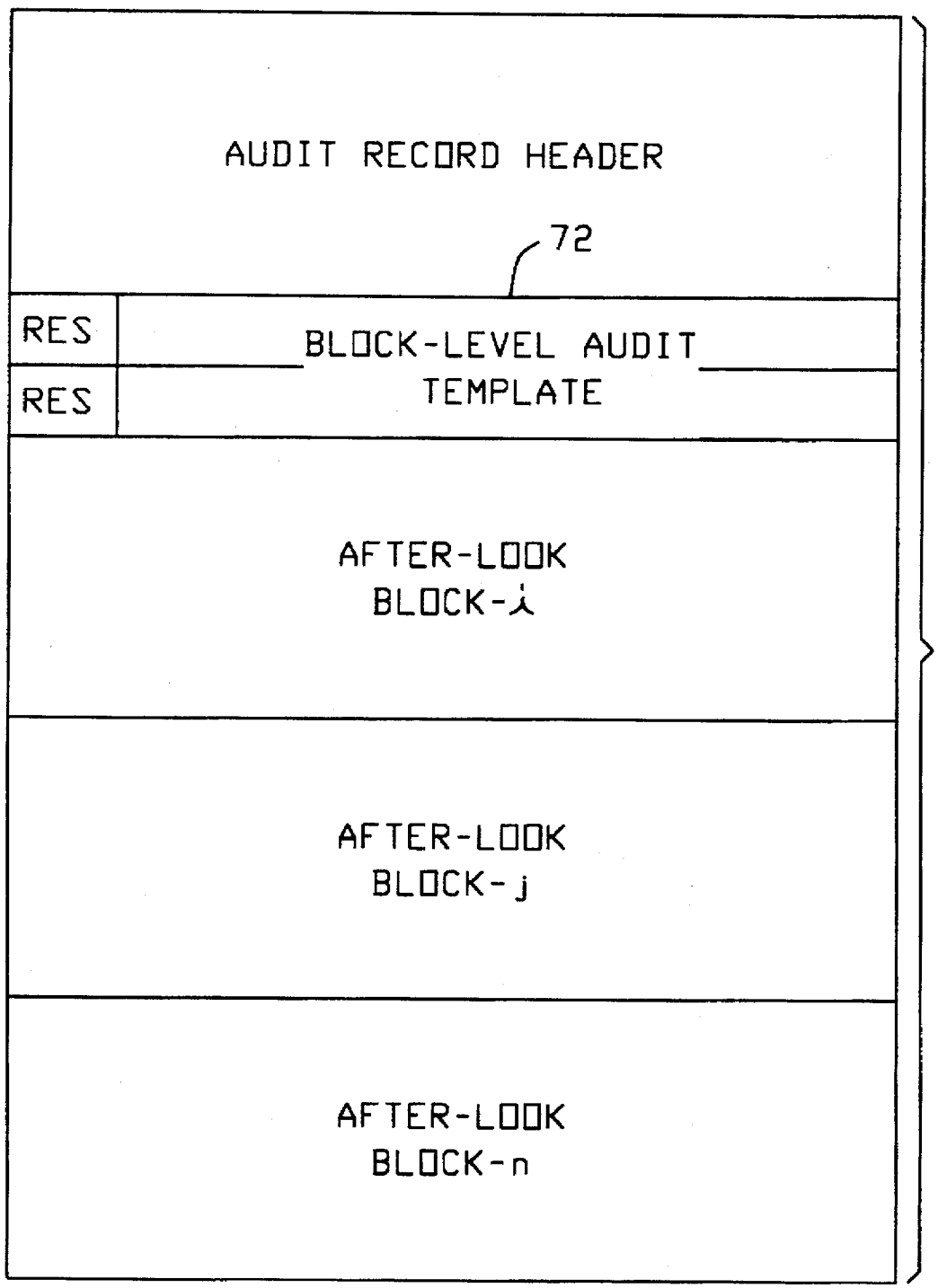
FIG. 6 illustrates the content of an Audit Record within the Audit File.

FIG. 6 illustrates the content of an Audit Record 66 within the Audit File 24. An Audit Record consists of an Audit Record Header that contains, along with information that is beyond the scope of the present invention, a Block-level Audit Template 72. The Block-level Audit Template is stored in two 36-bit words, wherein the first four bits of each word are reserved.

The Block-level Audit Template 72 indicates which Blocks within a Segment 52 are present in the Audit Record 66. Thus, bits in the Block-level Audit Template corresponding to Blocks i, j, and n are set. Bit 4 of the first word of the Block-level Audit Template corresponds to Block 0 of a Segment, Bit 5 corresponds to Block 1, and so forth, and Bit 35 of the first word corresponds to Block 31. Bit 4 of the second word of the Block-level Audit Template corresponds to Block 32 of a Segment, Bit 5 corresponds to Block 33, and so forth, and Bit 35 of the second word corresponds to Block 63.

The remaining information in the Audit Record 66 are the respective 28 word Blocks.

Figure 7:
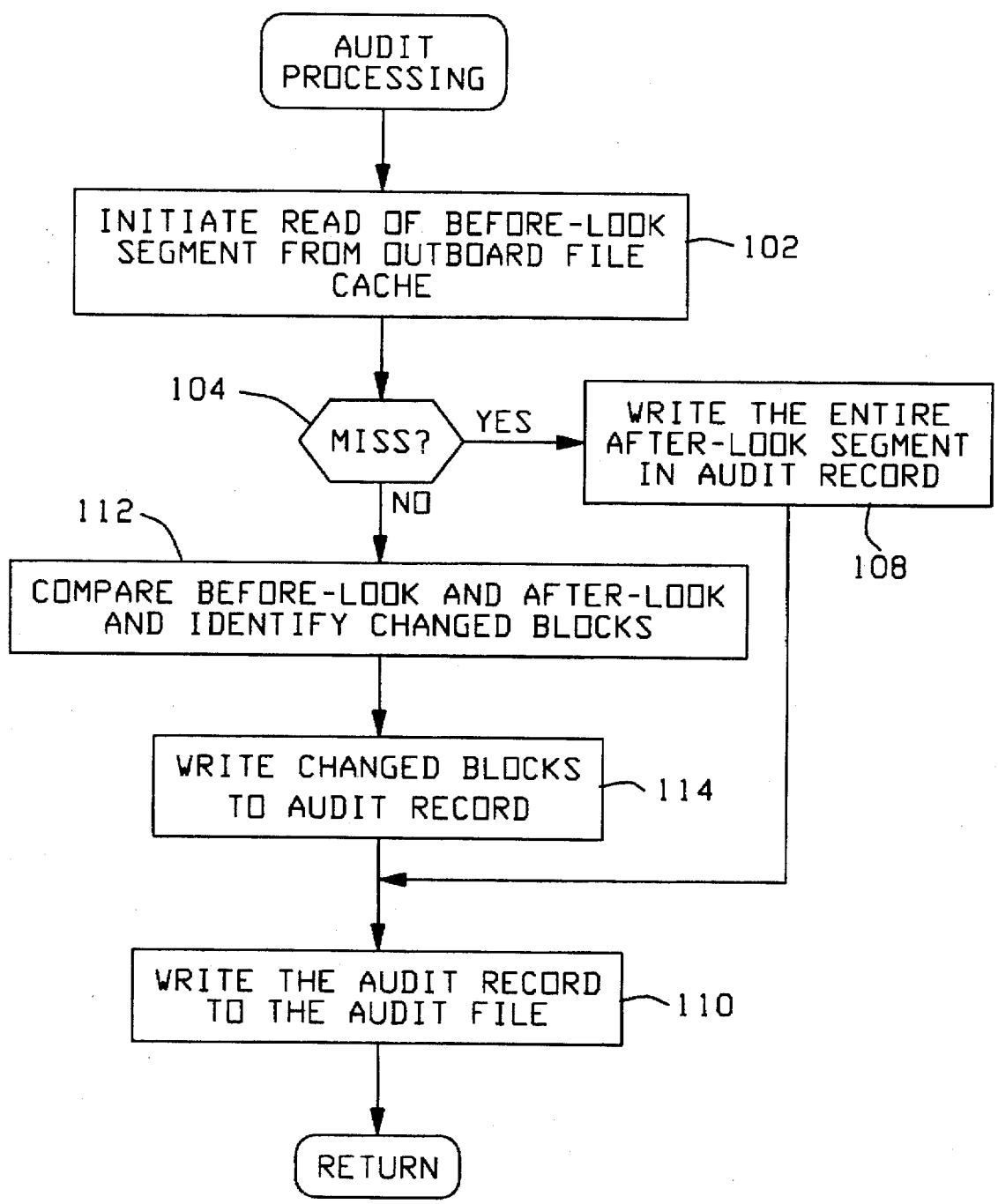
FIG. 7 is a flowchart of the audit processing performed by the Transaction Processing System software as it relates to the present invention.

FIG. 7 is a flowchart of the audit processing performed by the Transaction Processing System software 26 as it relates to the present invention. The audit processing of the present invention provides for writing to the Audit File 24 an Audit Record 66 that contains only the Blocks of a Segment 52 that have been modified as a result of a transaction.

Step 102 initiates a read of the referenced Before-look Segment from the Outboard File Cache 18. Decision Step 104 tests whether the Before-look Segment 64 was read from the Outboard File Cache. If the Before-look Segment was not present in the Outboard File Cache, control is directed to Step 108 where the entire After-look Segment 62 is written in an Audit Record 66. All the bits in the Block-level Audit Template 72 in the Audit Record are set because the entire After-look Segment was stored in the Audit Record. Control is directed to Step 110 where the Audit Record 66 is written to the Audit File 24 and then control is returned the Transaction Processing Application software 20 for processing more transactions.

If the Before-look Segment 64 is present in the Outboard File Cache 18 and was successfully read, Step 112 compares the Before-look Segment to the After-look Segment to identify which Blocks changed as a result of processing a transaction. The changed Blocks are then written to the Audit Record at Step 114. The proper bits in the Block-level Audit Template 72 in the Audit Record 66 are also set. Processing continues at Step 106 as described above.

Figure 8:
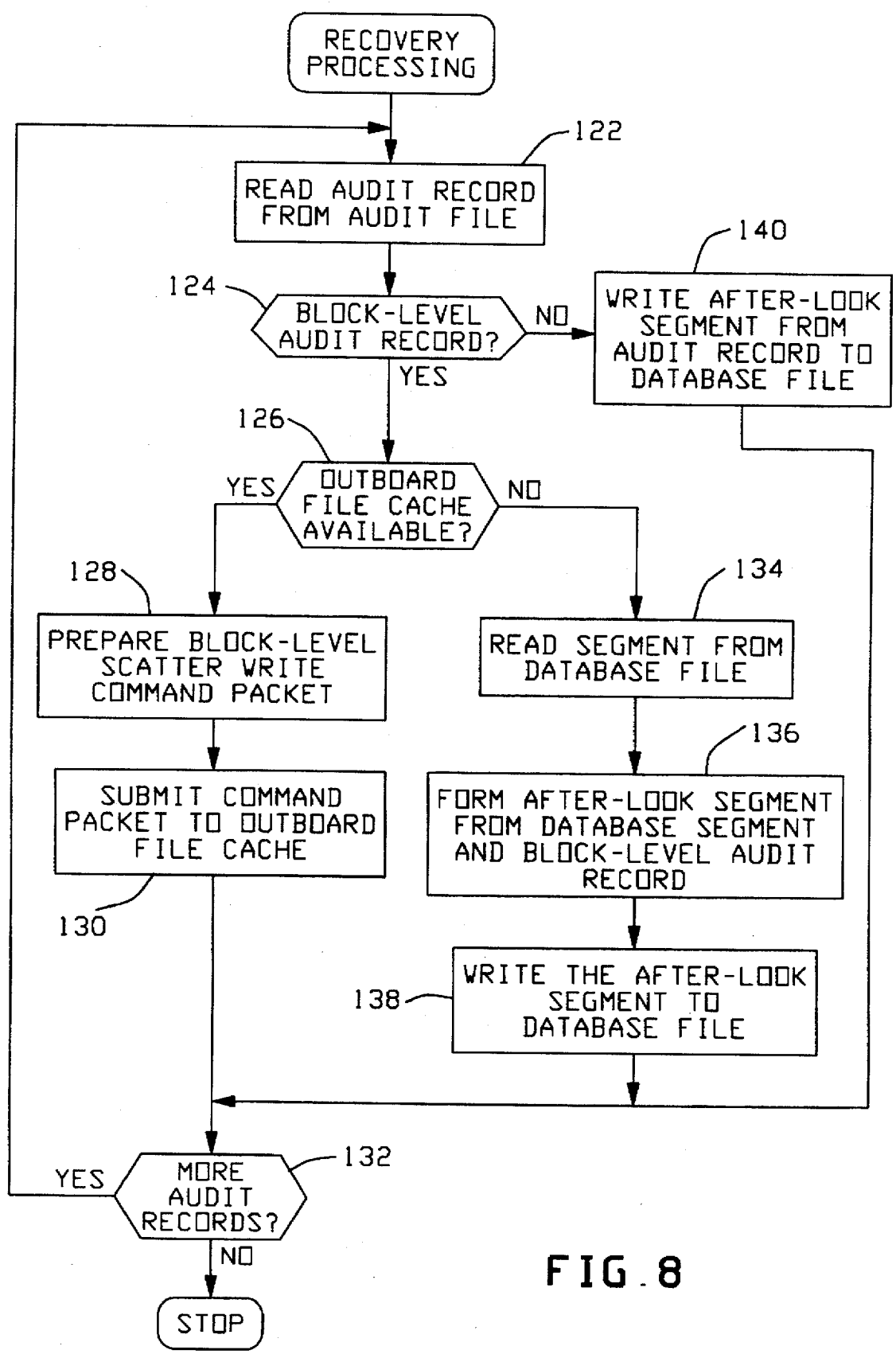
FIG. 8 is a flowchart of the recovery processing performed by the Transaction Processing System software as it relates to the present invention.

FIG. 8 is a flowchart of the recovery processing performed by the Transaction Processing System software 26 as it relates to the present invention. Step 122 reads an Audit Record 66 from the Audit File 24. Decision Step 124 tests whether the Audit Record is a block-level Audit Record by testing the Block-level Audit Template 72. If there are bits in the Block-level Audit Template which are not set, then the Audit Record does not contain all the blocks in the After-look Segment 62. Control is directed to decision Step 126 for a block-level Audit Record.

Decision Step 126 tests whether the Outboard File Cache 18 is available. If so, control is directed to Step 128 to prepare a Block-level Scatter Write Command Packet to submit to the Outboard File Cache. FIG. 12 may be consulted for further details on the Block-level Scatter Write Command Packet. At Step 130, the Block-level Scatter Write Command Packet is sent to the Outboard File Cache for processing and upon return of control, processing proceeds to decision Step 132 to test whether there are additional Audit Records 66 in the Audit File 24 to process. If there are more Audit Records to process, control returns to Step 122. Otherwise, recovery processing is complete. It should be noted that the Block-level Scatter Write Command Packet allows for the specification of up to eight segments. Thus, at this point in the processing it would be advantageous to identify eight segments for inclusion in the Command Packet. This aspect of the processing is not shown in the Recovery Processing flowchart in the interest of readability.

If the Outboard File Cache 18 is not available, decision Step 126 directs control to Step 134. Step 134 reads from the Disk 14 the proper Segment 52 of the Database file 24. The Segment read from the Disk is combined with the Blocks from the Audit Record 66 to form an After-look Segment 62. The After-look Segment is then written to the Database file 24 on the Disk 14. Processing then continues at decision Step 132 as described above.

If decision Step 124 finds that the Audit Record 66 contains the entire After-look Segment 62, control is directed Step 140. Because the entire After-look Segment is available in the Audit Record, Step 140 writes the After-look Segment to the proper location in the Database file 22 and processing continues at Step 132.

Figure 15G:
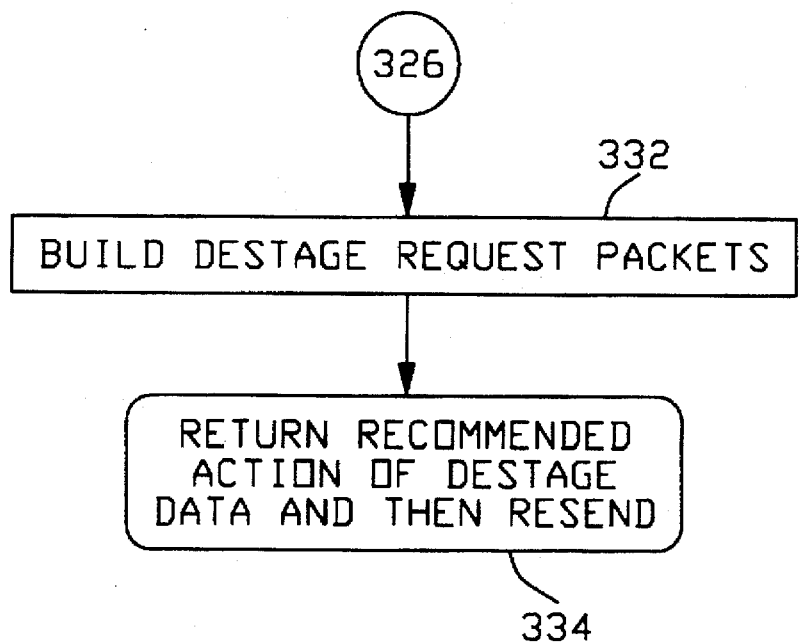
FIG. 15 shows the relationship between FIGS. 15A–G which contain a flowchart of the processing performed by the Outboard File Cache 18 for a Block-level Scatter Write command.
Figure 15:
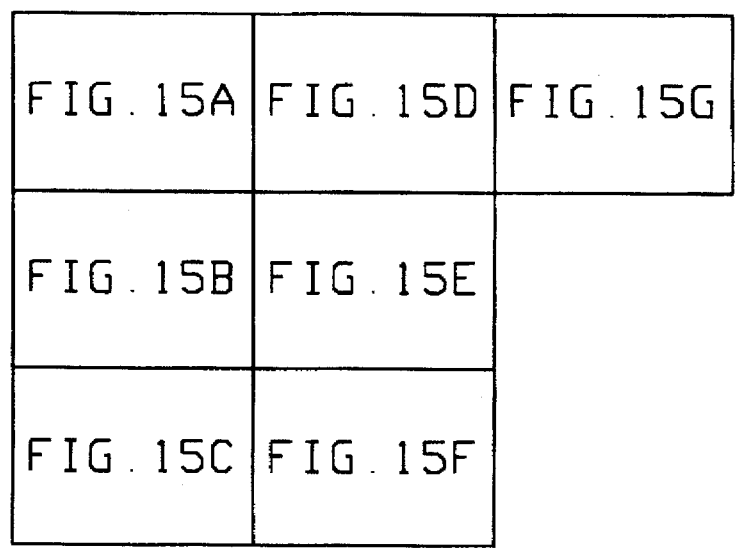
Figure 15A:
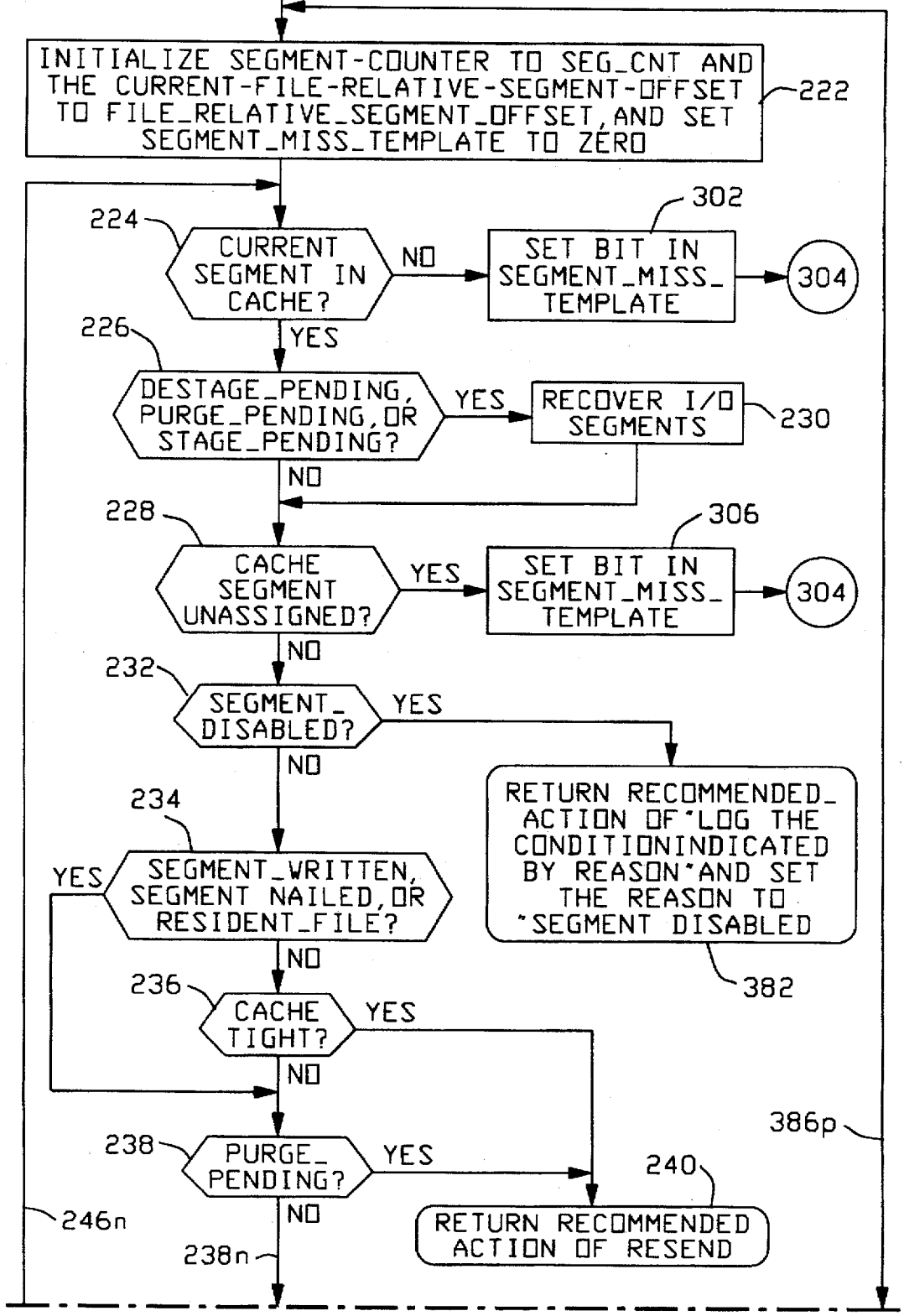
Figure 15B:
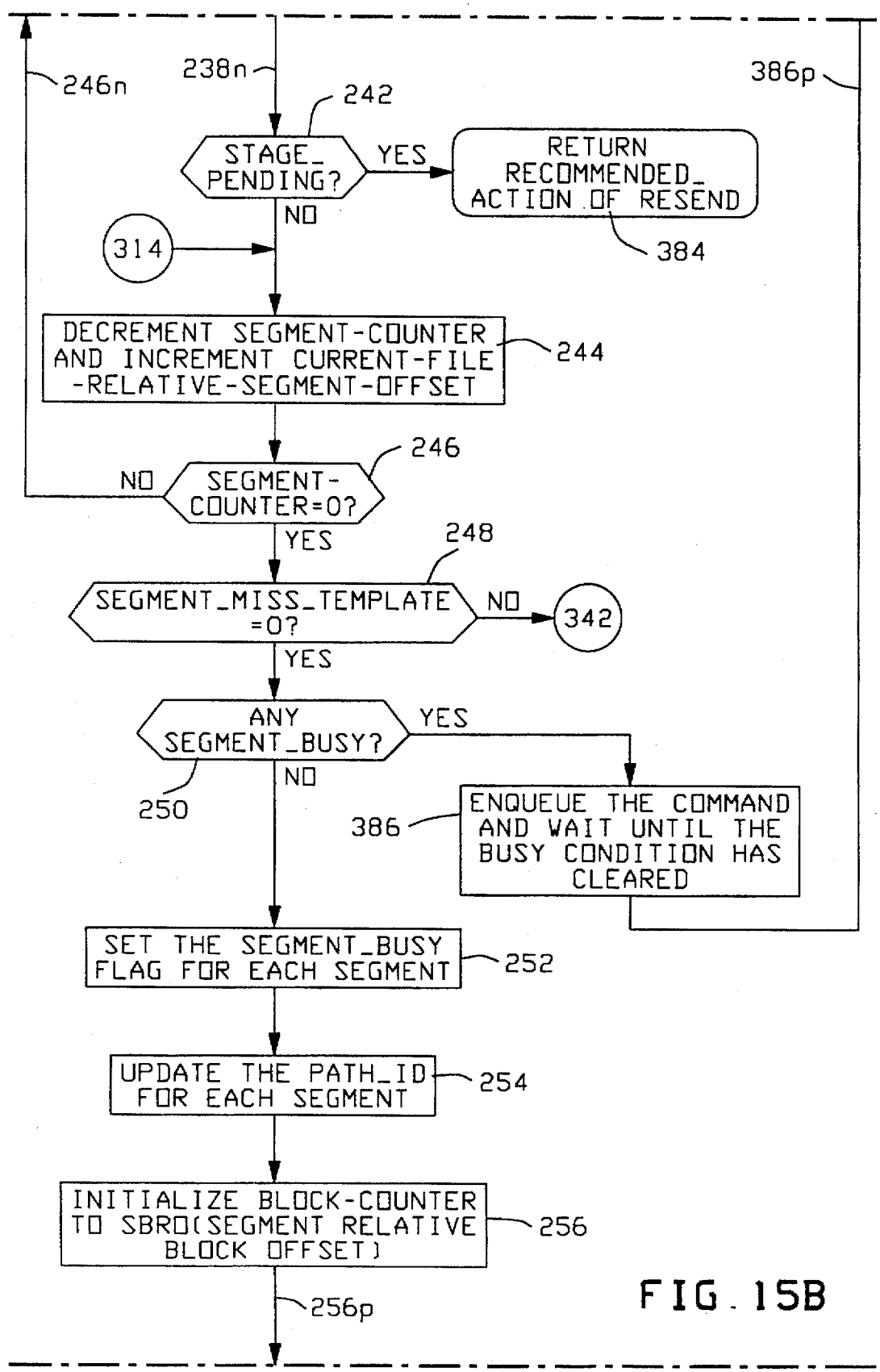
Figure 15C:
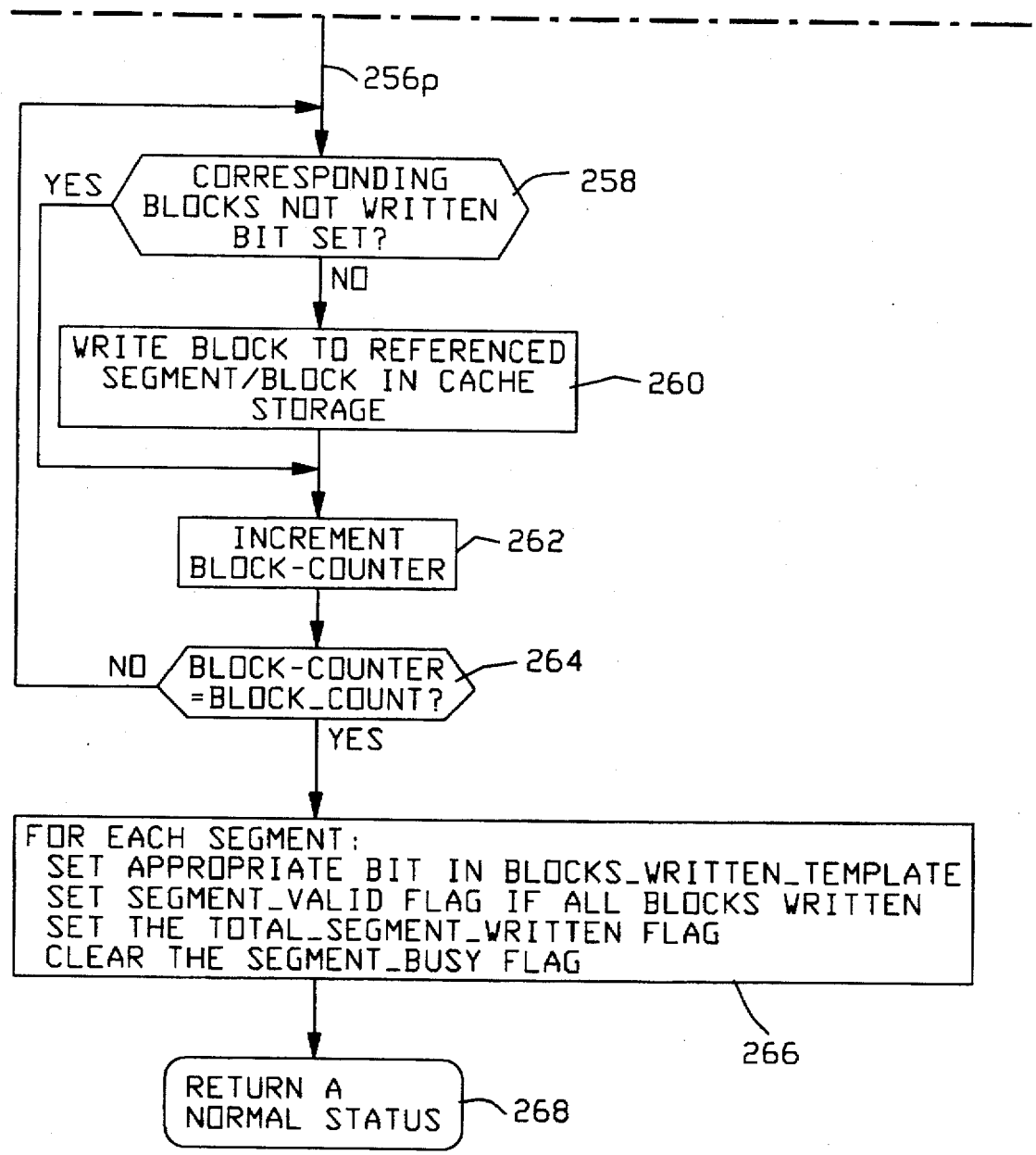
Figure 15D:
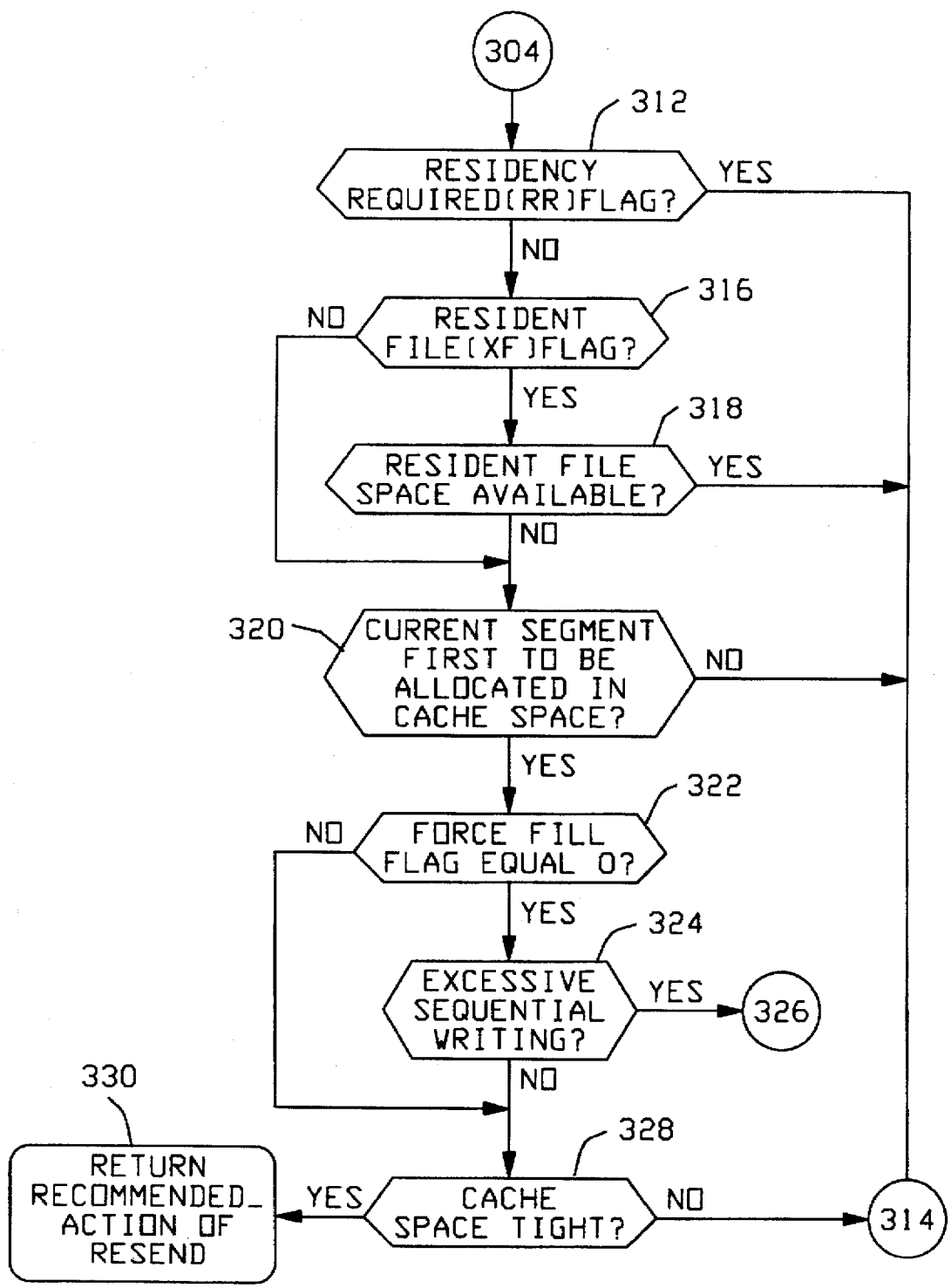
Figure 15E:
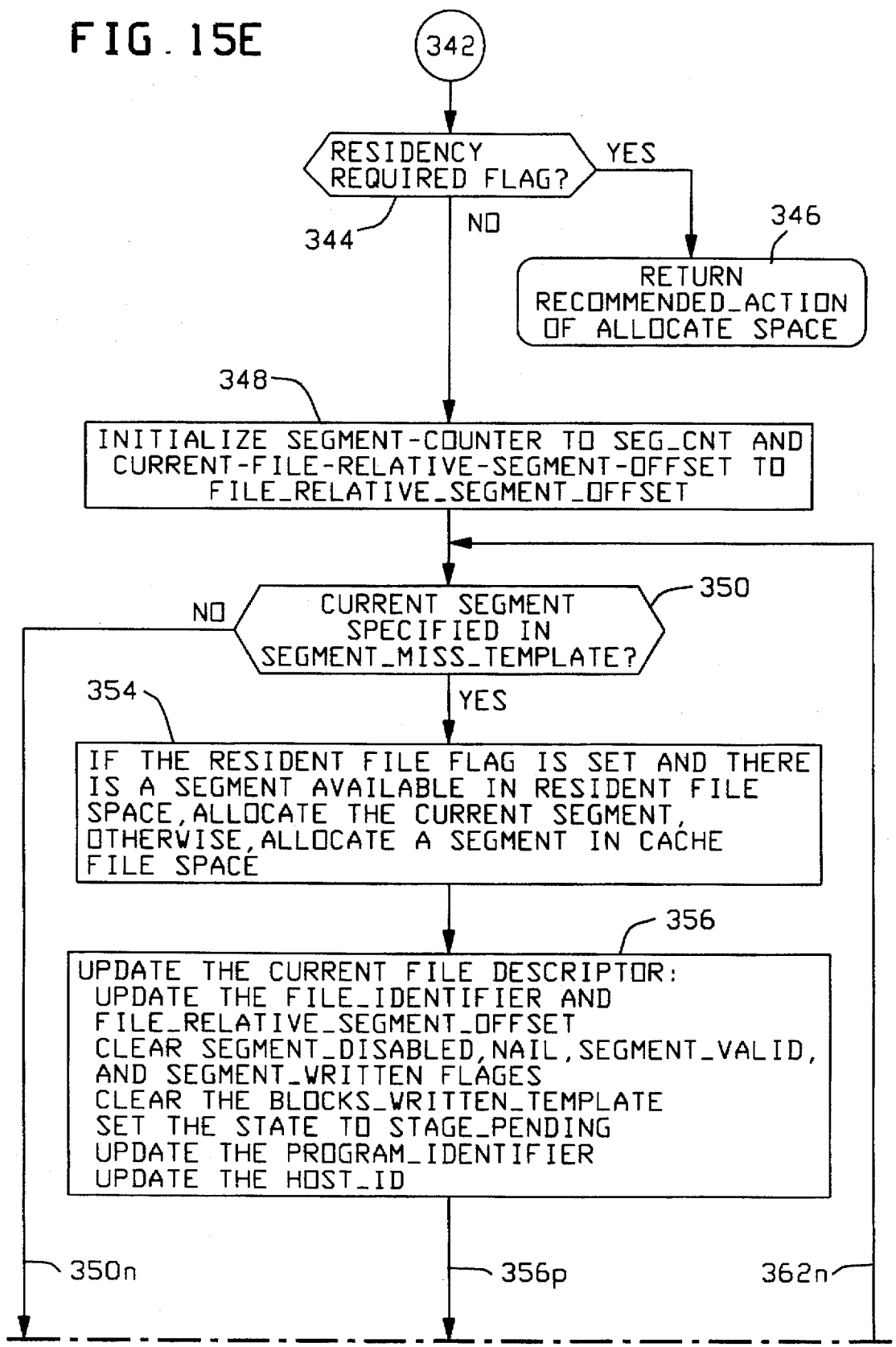
Figure 15F:
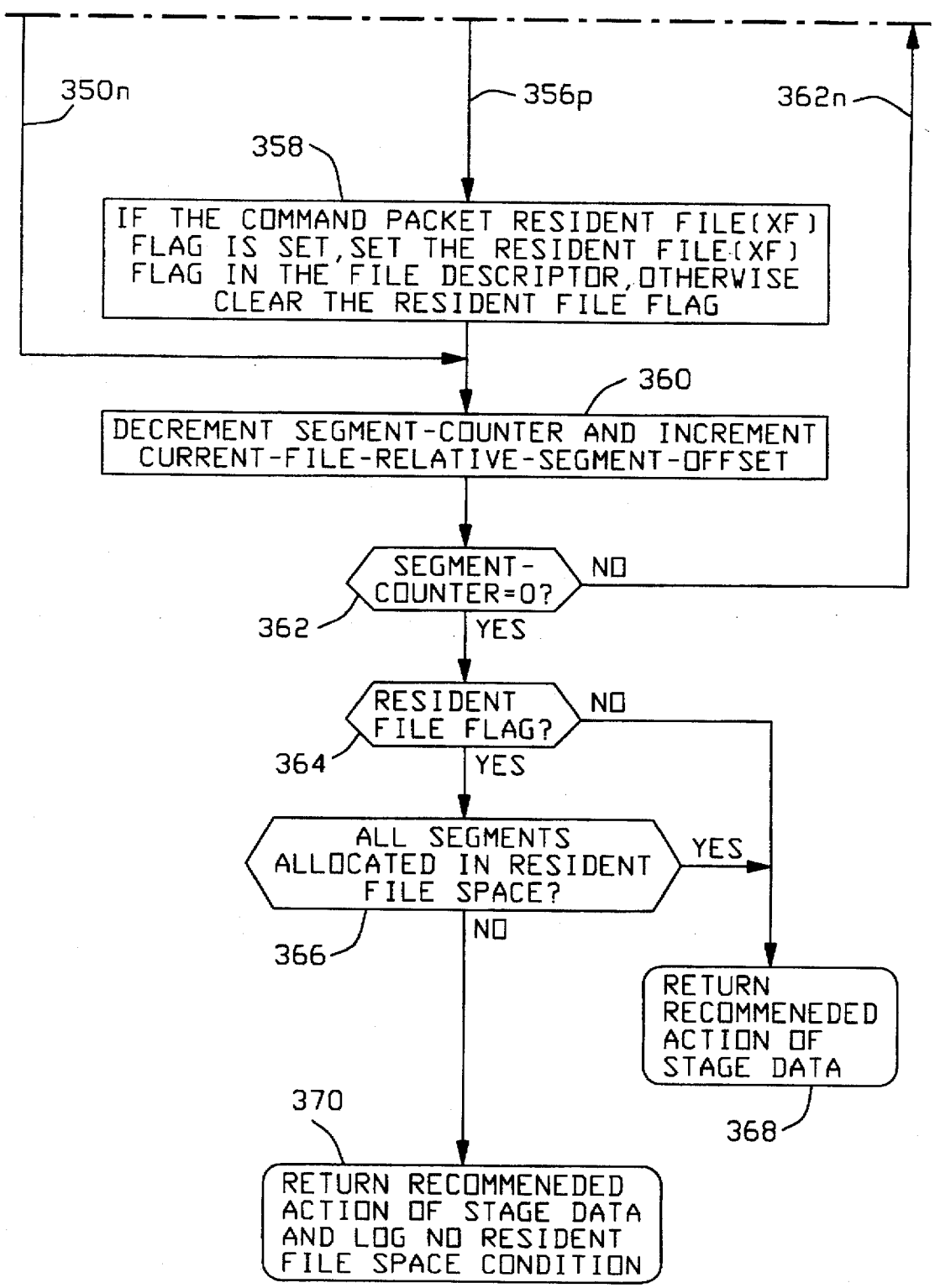

FIG. 15 shows the relationship between FIGS. 15A–G which contain a flowchart of the processing performed by the Outboard File Cache 18 for a Block-level Scatter Write command. However, before the processing of FIG. 15 is described, background information for the Outboard File Cache is presented in FIGS. 9–14. Further details on the structure, processing, and capabilities of the Outboard File Cache are described in the cross-referenced co-pending patent application.

Figure 9:
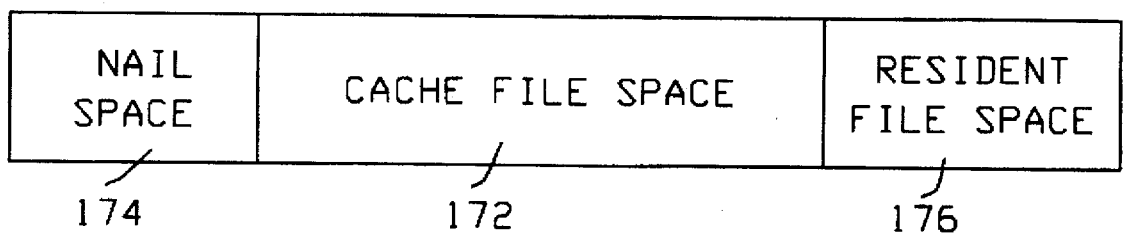
FIG. 9 shows the logical division between Cache File Space, Nail Space, and Resident File Space in the Cache Storage of the Outboard File Cache.

FIG. 9 shows the logical division between Cache File Space 172, Nail Space 174, and Resident File Space 176 in the Cache Storage 28 of the Outboard File Cache 18. The proportion of segments allocated between Cache File Space, Nail Space, and Resident File Space varies according to runtime requirements. Cache File Space is allocated segment by segment to files. As demand for Cache File Space increases, allocation of segments is managed according to a cache replacement algorithm. Segments in Resident File Space are assigned to tracks of files which are to remain in Cache Storage for an extended period of time. For example, Resident File Space may be used for files which are accessed frequently and for data which is recovery critical. The segments in Resident File Space are not eligible for cache replacement. An overview of Cache File Space management and Resident File Space management is provided in the following paragraphs.

A segment in Cache File Space 172 may either be "nailed" or "unnailed." A nailed segment is one that is permanently stored in the Outboard File Cache 18. A nailed segment remains in Cache File Space until it is purged by the Data Processing System 10. The Outboard File Cache never initiates deassignment or destaging (transferring the segment to disk) of a nailed segment because there is no disk space backing up a nailed segment. Nailed segments are used where Data Processing System software determines that certain segments must be in cache when accessed and should not be eligible for cache replacement, such as for recovery files. Nailed segments can only reside in Cache File Space but are not allowed to consume all of Cache File Space.

An unnailed segment will remain in Cache File Space 172 until any one of the following occurs:

1. The unnailed segment is purged by the Data Processing System 10.
2. The Outboard File Cache 18 detects that the RAM occupied by the segment is unusable.
3. The Cache File Space replacement algorithm determines that the segment should be assigned to another track.
4. The Outboard File Cache determines that the segment should be removed from Cache File Space and made part of the Resident File Space 176.

Resident File Space 176 is comprised of segments that are associated with tracks of files. Once a segment in Resident File Space is assigned to a track, it will remain assigned until any one of the following occurs:

1. The segment is purged by the Data Processing System 10.
2. The Outboard File Cache 18 detects that the RAM occupied by the segment is unusable.
3. The Outboard File Cache determines that the demand for Resident File Space relative to the demand for Cache File Space 172 is such that the segment should be deassigned so that it can be reallocated to Cache File Space.

Allocation of segments in Resident File Space 176 is done on a first-come first-served basis. Once all Resident File Space segments have been allocated, a segment in Cache File Space 172 is allocated. A segment in Cache File Space which is allocated to a file which has other segments in Resident File Space, is subject to cache replacement. Therefore, the Dam Processing System 10 which requests Resident File Space must monitor the availability and usage of Resident File Space.

Figure 10:
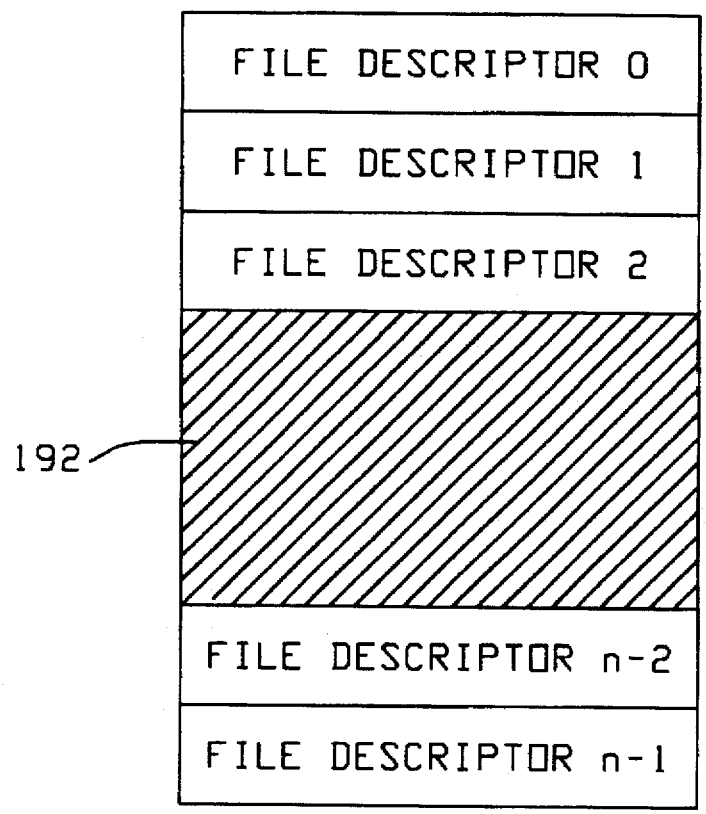
FIG. 10 illustrates the File Descriptor Table.

FIG. 10 illustrates the File Descriptor Table 192. The File Descriptor Table is stored and maintained by the Outboard File Cache 192 and contains information for allocating and referencing each of the segments in the Cache Storage 28. There are n File Descriptors in the File Descriptor Table, numbered consecutively from 0 to n-1.

FIG. 11 shows the information contained in a File Descriptor 194. Each File Descriptor has 16 32-bit words. The content and format of a File Descriptor is as follows:

| Word | Bit | Definition |
| --- | --- | --- |
| 0 | 0–3 | Reserved. |
| 0 | 4–7 | IXP_# is beyond the scope of the present invention.. |
| 0 | 8–15 | PATH_ID is beyond the scope of the present invention. |
| 0 | 16–31 | SEGMENT FLAGS are used to indicate various characteristics of the segment in Cache Storage 28 that is referenced by the File Descriptor. The flags include the following: SEGMENT_WRITTEN is set when the Segment has been updated via a write command since the segment was assigned. This flag is cleared when the Segment is destaged. TOTAL_SEGMENT_VALID is set when all blocks within a Segment are valid. A segment is valid when each block in the segment contains the most recent copy of the user's data. SEGMENT_DISABLED identifies when a hardware error was discovered for the associated segment. SPECULATIVE/ORPHAN this flag is beyond the scope of the present invention. SEGMENT_UNAVAILABLE is used to indicate whether the segment referenced by the File Descriptor is eligible for cache replacement (reassignment). If this flag is set, then cache replacement algorithm does not consider the referenced Segment for reassignment. When this flag is set, the HASH_LINK points to the next segment available for cache replacement SEGMENT_BUSY is used to indicate whether a read or write operation is in progress for the referenced Segment. The flag is set when a command is decoded, and remains set until the BLOCKS_WRITTEN_TEMPLATE has been updated. PURGE_PENDING is used to indicate that a PURGE command found the referenced Segment had been updated, and is presently waiting for the Segment to be destaged before purging the segment. DESTAGE_PENDING is used to indicate that a DESTAGE command is in process. The flag is set when a DESTAGE command is decoded and cleared when the corresponding DESTAGE COMPLETE command is decoded. STAGE_PENDING is used to indicate that a READ or WRITE command resulted in a miss condition, the Segment has been assigned, and the Segment is busy until the data has been written to the Segment. ALLOCATED_WRITE_MISS this flag indicates that the segment was assigned by either an ALLOCATE command or a WRITE command. SEQUENTIAL_SEGMENT this flag is beyond the scope of the present invention. RESIDENT_FILE indicates whether the segment belongs to a Resident File. STICKING_MASTER this flag is beyond the scope of the present invention. NAIL is set when a Segment is not eligible for reassignment. HOSTNAIL this flag is beyond the scope of the present invention. PRE-USE this flag is beyond the scope of the present invention. |
| 1–2 | | FILE_IDENTIFER identifies the file to which the segment is assigned. |
| 3 | | FILE_RELATIVE_SEGMENT_OFFSET indicates the location of the segment relative to the first segment in the file. |
| 4 | | HASH_LINK/BADPTR/NAIL_LINK are pointers used for managing Cache Storage 28. |
| 5 | 0–20 | DATA_POINTER is the physical address in Cache Storage 28 where the segment is stored. It is fixed at initialization and always points to the same address in Cache Storage. |
| 5 | 21–27 | FLAG ANNEX contains more flags which indicate charactelistics of the segment referenced by the File Descriptor. These flags are beyond the scope of the present invention. |
| 5 | 28–31 | BPID is beyond the scope of the present invention. |
| 6–7 | | BLOCKS_WRITTEN_TEMPLATE contains one bit for each block in the segment. If a bit is set, it indicates that at some time after the segment was last destaged, the corresponding block was updated. Bit 0 of Word 6 corresponds to Block 0 of a Segment 52, Bit 1 of Word 6 corresponds to Block 1, . . . , Bit 31 of Word 6 corresponds to Block 31, Bit 0 of Word 7 corresponds to Block 32 of Segment 53, . . . , and Bit 31 of Word 7 corresponds to Block 63. |
| 8 | 0–7 | HOST_ID is beyond the scope of the present invention. |
| 8 | 8–15 | GROUP_ID is beyond the scope of the present invention. |
| 8 | 16–23 | FILE_SESSION is beyond the scope of the present invention. |
| 8 | 24–31 | HOST_SESSION is beyond the scope of the present invention. |
| 9 | 0–31 | LEG1_DISK_NUMBER identifies the first disk on which the segment is stored. "Leg" refers to the I/O Path on which the disk resides. |
| 10 | 0–31 | LEG2_DISK_NUMBER identifies the second disk on which the segment is stored. |
| 11 | | LEG1_DISK_ADDRESS specifies the address on the leg-1 disk at which the segment is stored. |
| 12 | | LEG2_DISK_ADDRESS specifies the address on the leg-2 disk at which the segment is stored. |
| 13–14 | | These words are unused. |
| 15 | | PROGRAM_ID idenfifies the Outboard File Cache program issued by a Host 10 that is in the process of destaging, purging, or staging the segment. |

FIG. 12 shows the format of a Block-level Scatter Write Command Packet 196.

The following table explains each of the fields:

| Word | Bit | Definition |
| --- | --- | --- |
| 0–1 | | These words contain parameters relating to data transfer. |
| 0 | 0–17 | WORD_COUNT is the number of words that will be transferred to the Outboard File Cache 18. If DAC specifies anything other than data chain pointer, this field is non-zero. If DAC specifies a data chain pointer, WORD_COUNT is ignored. |
| 0 | 18 | DC is the Data Chain Flag. If DC=0, then data chaining is not in effect. If DC=1, then data chaining is in effect. This flag is beyond the scope of the present invention. |
| 0 | 19–21 | DAC is the Data Address Control which indicates how the ADDRESS field is interpreted. |

-continued

| Word | Bit | Definition |
|---|---|---|
| | | DAC=0 indicates that the data address is to be incremented in performning the data transfer. The ADDRESS contains the real address of the first word of a buffer in the main storage of the Data Processing System 10. |
| | | DAC=1 indicates that the data address is to be decremented in performing the data transfer. ADDRESS contains the real address of the fast word of a buffer in the main storage of the Data Processing System. |
| | | DAC=2 indicates that ADDRESS contains the real address of a buffer in the main storage of the Data Processing System consisting of a single word and that no incrementing or decrementing of the ADDRESS takes place when the word is transferred. |
| | | DAC=3 indicates that the contents of ADDRESS is ignored. |
| | | DAC=4 indicates that the ADDRESS contains the real address of the next data block to transfer. |
| 0 | 22–35 | Reserved. |
| 1 | 0–35 | ADDRESS indicates the real address of a word in the main storage of the Data Processing System 10. |
| 2 | | NEXT_COMMAND_PACKET is the real address of the next Command Packet in a linked list of Command Packets. |
| 3 | 0–3 | Reserved. |
| 3 | 5 | CCF is the Command Chain Flag. CCF=0 indicates that command chaining is not in effect, and CCF=1 indicates that command chaining is in effect, that is, there is a linked list of Command Packets to process. |
| 3 | 6–11 | LENGTH is the number of words contained in the Command Packet starting with word 4. |
| 3 | 12–23 | BLOCK_COUNT is the total number of blocks to be considered for writing to the Outboard File Cache 18. |
| 3 | 24–35 | COMMAND_CODE indicates the command that the Outboard File Cache 18 should execute, in this case a Block-level Scatter Write. |
| 4–5 | | These words are referred to as the FILE_IDENTIFIER which indicates the file from which the data is to be read. |
| 4 | 0–3 | Reserved. |
| 4 | 4–9 | This field is beyond the scope of this invention. |
| 4 | 10–17 | HOST_ID indicates a Data Processing System 10. If H=0, HOST_ID indicates whether the file is shared by multiple Data Processing Systems. If the file is not shared, the HOST_ID indicates which Data Processing System owns the file. If HOST_ID=0, then the file is shared. If HOST_ID >0, then the file is local to the Data Processing System indicated by the HOST_ID. |
| 4 | 18–35 | This field is beyond the scope of this invention. |
| 5 | 0–3 | Reserved. |
| 5 | 4 | H is the Hardware flag. This flag differentiates between FILE_IDENTIFIERs generated by the Data Processing System 10, and those generated by the Outboard File Cache 18. If H=0, the FILE_IDENTIFIER was generated by Data Processing System, and if H=1, the FILE_IDENTIFIER was generated by the Outboard File Cache. |
| 5 | 5–35 | This field is beyond the scope of this invention. |
| 6 | | FILE_RELATIVE_SEGMENT_OFFSET is the first segment, relative to the beginning of the file, that is addressed by the command. The FILE_RELATIVE_SEGMENT_OFFSET is equal to the logical track number of the segment. |
| 7 | 0–3 | Reserved. |
| 7 | 4 | FF is the Force Fill flag. If a cache miss condition is encountered and FF is set, the Outboard File Cache 18 bypasses the test for a sequential write. If the RR flag is set the FF flag is ignored. |
| 7 | 5 | RR is the Residency Required flag which indicates whether all data referenced by the command should be in Resident File Space 176. If RR=0, then residency is not required, and if RR=1, then residency is required. If RR=1 and any of the following conditions are true, then no segments are allocated or placed in a stage pending state and the command is terminated with an appropriate status. The conditions are:<br>a) any segment referenced by the command is not resident; or |

-continued

| Word | Bit | Definition |
|---|---|---|
| | | b) any block referenced by the command is not valid. |
| 7 | 6 | XF is the Outboard File Cache Resident File flag. If RR=1, then XF is ignored. |
| 7 | 7–23 | Reserved. |
| 7 | 24–29 | SRBO is the Segment Relative Block Offset. This is the first block, relative to the beginning of the first segment, that is referenced by the command. |
| 7 | 30–35 | SEG_CNT is the number of segments that are rerefenced by the command. |
| 8–n | | The Blocks Not Written Table contains a two-word entry for each segment referenced by the command. Each entry specifies which blocks within the associated segment are not to be written. The value for n may be 9, 11, 13, 15, 17, 19, 21, or 23. |

FIG. 13 shows the format of an entry in the Blocks Not Written Table in the Block-level Scatter Write Command Packet 196. Each entry is referred to as a BLOCKS_NOT_WRITTEN_TEMPLATE 198 and the following table explains each of the fields:

| Word | Bit | Definition |
|---|---|---|
| 0–1 | 0–3 | Reserved. |
| 0–1 | 4–35 | The BLOCKS_YET_WRITTEN_TEMPLATE indicates which blocks must not be written in Cache Storage 28 for the associated segment. Bits 4–35 of word 0 correspond to Blocks 0–31 of the segment and Bits 4–35 of word 1 correspond to Blocks 32–63 of the segment. Within word 0, bit 4 corresponds to Block 0, bit 5 corresponds to Block 1 and so forth, and bit 35 corresponds to Block 31. Within word 1, bit 4 corresponds to Block 32, bit 5 corresponds to Block 33 and so forth, and bit 35 corresponds to Block 63. Note that all bits corresponding to blocks not addressed by the command are ignored. For example, if SRBO=30 and BLOCK_COUNT=39, then bits 4 through 33 of word 0 of the first entry are ignored and bits 9–35 of word 1 of the entry corresponding to the last segment addressed by the command are ignored. |

FIG. 14 shows the format of a Block-level Scatter Write Status Packet 200. The following table explains each of the fields:

| Word | Bit | Definition |
|---|---|---|
| 0–1 | 0–5 | Valid Flag (VF) is beyond the scope of the present invention. |
| 0 | 6–17 | Reserved. |
| 0 | 18–35 | UPI_NUMBER is beyond the scope of the present invention. |
| 1 | 0–3 | Reserved. |
| 1 | 4–35 | PROGRAM_ID is a value which identifies the Command Packet (or linked list of Command Packets) which is associated with the Status Packet. If NO_PROGRAM in the FLAGS field is set, PROGRAM_ID is reserved. Every Outboard File Cache program issued by the Data Processing System has an associated PROGRAM_ID which is unique within the Data Processing System. When status is returned, PROGRAM_ID is used to relate the status to the program to which it applies. Note that PROGRAM_ID applies to all commands within a single program. |
| 2 | 0–35 | COMMAND_PACKET_ADDRESS is a value which contains the real address of the Command Packet to which the status applies. When a chain of commands is submitted to the Outboard File Cache for processing, the Command Packet Address will point to the Command Packet which caused an error. If all the |

-continued

| Word | Bit | Definition |
|---|---|---|
| | | Command Packets in the command chain were processed without error, then the Command Packet Address points to the last Command Packet in the command chain. |
| 3 | 3–35 | HARDWARE_DEPENDENT_STATUS_1 is beyond the scope of the present invention.. |
| 5 | 0–35 | HARDWARE_DEPENDENT_STATUS_2 is beyond the scope of the present invention.. |
| 5 | 0–11 | RECOMMENDED_ACTION is the processing that should be performed by the Data Processing System upon receiving a Status Packet. |
| 5 | 12–23 | REASON indicates the condition that caused the particular status to be returned. |
| 5 | 24–29 | COUNT is the recommended number of times that the Data Processing System should retry when responding to the status in the Status Packet. For example, if the RECOMMENDED_ACTION returned is Resend, then the Count indicates the number of times that the Data Processing System should resend the Command Packet. If NO_PROGRAM in the FLAGS field is not set and the RECOMMENDED_ACTION does not equal "no action required", this field specifies the number of times the command specified by the Command Packet pointed to by COMMAND_PACKET_ADDRESS should be retried. Retries apply only to that command and not to any other commands in a command chain. If NO_PROGRAM in the FLAGS field is not set and RECOMMENDED_ACTION equals "no action required", COUNT must be equal to 0. If NO_PROGRAM in the FLAGS field is set, this field is reserved. |
| 5 | 30–35 | FLAGS is a set of bits that relay ancillary information. |
| 5 | 30 | PRIORITY_DESTAGE indicates whether priority destage is required. If PRIORITY_DESTAGE is set, then the Destage Request Packets in the Destage Request Table refer to segments that must be destaged as soon as possible. If NO_PROGRAM is set or DESTAGE_REQUEST_PACKETS is not set, PRIORITY_DESTAGE must equal 0. |
| 5 | 31 | DESTAGE_REQUEST_PACKETS is a flag which indicates whether the Destage Request Table exists. If NO_PROGRAM is set or the status applies to an invalid command, or the status applies to a non-I/O command, then this flag must be 0. |
| 5 | 32 | TERMINATED_POLLING is a flag which indicates that a particular queue of command packets is no longer being polled. |
| 5 | 33 | Reserved. |
| 5 | 34 | NO_PROGRAM is a flag which indicates whether the status is associated with a command packet. If NO_PROGRAM is set, then the status is not associated with a command packet. |
| 5 | 35 | Reserved. |
| 6 | 0–35 | STATISTICS is a set of codes which indicate how successful the Outboard File Cache 18 has been in avoiding destaging file data, speculating upon the future file access commands, and the time the Outboard File Cache spent in processing the Command Packet(s). |
| 7 | 0–11 | RESEND_TIME is used to indicate to the Data Processing System that the Outboard File Cache is in the process of performing a set of actions to recover from an internal fault condition. The nature of the fault recovery prohibits the Outboard File Cache from responding to any commands received from a Data Processing System. When a command is received, it is not processed by the Outboard File Cache and is returned to the sending system with a RECOMMENDED_ACTION equal to "Resend." RESEND_TIME is only used when the NO_PROGRAM flag is not set and the RECOMMENDED_ACTION is Resend. |
| 7 | 12–17 | Reserved. |
| 7 | 18–35 | DESTAGE_REQUEST_PACKET_COUNT is the number of Destage Request Packets in the Destage Request Table. |
| | | If the DESTAGE_REQUEST_PACKETS bit in the FLAGS field is not set, this field is ignored. |
| 8 | 0–17 | Reserved. |
| 8 | 18–35 | SEGMENT_MISS_TEMPLATE indicates which of the segments addressed by the command were either not resident or contain invalid data. Each bit in the template maps to one of the segments. Bit 18 corresponds to the 1st segment addressed by the command, i.e., the segment specified by the command's FILE_RELATIVE_SEGMENT_OFFSET. Bit 19 corresponds to the second segment addressed by the command, and so forth up to bit 35 which corresponds to the eighteenth segment addressed by the command. If a bit is set, the corresponding segment was addressed by the command and contains invalid data. If a bit is not set, either the corresponding segment was not addressed by the command or it was resident and does not contain invalid data. |
| 9 | | Reserved. |
| 10 | | Reserved. |
| | 11–34 | Destage Request Table contains up to six Destage Request Packets. If the DESTAGE_REQUEST_PACKETS bit in the FLAGS field is not set or DESTAGE_REQUEST_PACKET_COUNT equals 0, the Destage Request Table is ignored. Each Destage Request Packet contains a FILE_IDENTIFIER, a FILE_RELATIVE_SEGMENT_OFFSET, SEG_CNT, LEG1_DISK_NUMBER, and LEG2_DISK_NUMBER. |
| 35–127 | | Reserved. |

FIG. 15 shows the relationship between FIGS. 15A–G which contain a flowchart of the processing performed by the Outboard File Cache 18 for a Block-level Scatter Write command. For segments referenced by the Command Packet 196, the Outboard File Cache writes Blocks as directed by the Blocks Not Written Table in the Command Packet.

Step 222 initializes counters that are used during the processing of the Command Packet 196. The Segment-counter is initialized to SEG_CNT from the Command Packet and the Current-file-relative-segment-offset is initialized to the FILE_RELATIVE_SEGMENT_OFFSET, and the SEGMENT_MISS_TEMPLATE in the Status Packet 198 is set to zero.

Decision Step 224 tests whether the current segment in process is present in the Outboard File Cache 18. If it is, control is directed to decision Step 228. If decision Step 228 finds that the referenced segment is assigned in Cache Storage 28 to the segment in process and decision Step 234 finds that the segment has not been disabled, control is directed to decision Step 234. Decision Step 234 tests whether the segment has its SEGMENT_WRITTEN flag set, and whether the segment has its RESIDENT_FILE or NAIL flags set. If not, control is directed to Step 236. Otherwise, Step 236 is skipped. Decision Step 236 tests whether the space available for allocation is Cache Storage is in short supply. If it is, or if decision Step 238 finds the state of the segment is PURGE_PENDING, control is directed to Step 240 where the RECOMMENDED_ACTION in the Status Packet 200 is set to Resend. Otherwise, control is directed to decision Step 242 via control Path 238n.

Decision Step 242 tests whether the STAGE_PENDING flag is set for the segment. If not, control is directed to Step 244 where the Segment-counter is decremented and the Current-file-relative-segment-offset is incremented. Decision Step 246 tests whether all the referenced segments have been processed by checking whether the Segment-counter equals zero. If there more segments to process, control is returned to decision Step 224 via control path 246n. Otherwise, processing continues at decision Step 248.

If all the segments referenced by the command are present in Cache Storage 28 as determined by decision Step 248, and none of the segments are busy as determined by decision Step 250, control is directed to Step 252. Step 252 sets the SEGMENT_BUSY flag in the File Descriptor 194 for each of the referenced segments. Step 254 updates the PATH_ID field in the File Descriptor, and Step 256 initializes a Block-counter to the Segment Relative Block Offset (SRBO) from the Command Packet 196.

Processing proceeds to decision Step 258 via control Path 256p where the bit in the Blocks Not Written Table in the Command Packet 196 that corresponds to the Block-counter is tested to determine whether the block should be written to Cache Storage 28. If the bit is not set, the block is written in the proper location in Cache Storage at Step 260. Otherwise, the block is not written to Cache Storage. Step 262 increments the Block-counter and decision Step 264 tests whether all of the blocks specified by the Command Packet have been processed. Control is returned to Step 258 if there are more blocks to process. Otherwise, control is directed to Step 266.

Step 266 adjusts various flags in the File Descriptors 194 for each of the segments processed. In particular, for each block written within a segment, the corresponding bit in the BLOCKS_WRITTEN_TEMPLATE is set in the File Descriptor 194. If all the blocks within a segment were written, the TOTAL_SEGMENT_VALID flag is set. The SEGMENT_WRITTEN is set and the SEGMENT_BUSY flag is cleared. Step 268 returns a normal status in the Status Packet 200.

Returning to FIG. 15A, if either the present segment in process is not in Cache Storage 28 or the File Descriptor 194 found is not presently assigned to the segment in process, as is respectively determined by decision Steps 224 and 228, the appropriate bit in the SEGMENT_MISS_TEMPLATE in the Status Packet 200 is set as shown by Steps 302 and 306, and control is directed, as referenced by Circle 304, to Step 312.

If the Residency Required (RR) flag in the Command Packet 196 is set, decision Step 312 returns control, as referenced by Circle 314, to Step 244. Otherwise, control is directed to decision Step 316 to test the Resident file (XF) in the Command Packet. If the Resident file flag is set, control is directed to decision Step 318 to test whether there is Resident File Space 176 available for allocation. If there is Resident File Space available, control is directed to Step 244 as indicated by Circle 314.

Control is directed to decision Step 320 if the Resident file (XF) flag in the Command Packet 196 is not set or there is no Resident File Space 176 available for allocation. If the current segment in process is the first to require allocation of space within Cache File Space 172, control is directed to decision Step 322. Otherwise, processing proceeds to Step 244 via Circle 314.

Decision Step 322 tests whether the Force Fill (FF) flag is set. If the Force Fill flag is not set, the Outboard File Cache 18 tests for excessive sequential writing of a file at Step 324. If excessive sequential writing is detected, control is directed to Step 332 as indicated by Circle 326. If the Force Fill flag is set, excessive writing of a file is ignored and control is directed to decision Step 328. Decision Step 328 tests whether the amount of Cache File Space 172 that is available for allocation is in short supply. If the cache tight condition is not present, control is directed to Step 244 via Circle 314. Otherwise, a RECOMMENDED_ACTION of Resend is returned to the Data Processing System 10.

If the Outboard File Cache 18 detects that excessive writing of the file, decision Step 324 directs control to Step 332 via Circle 326. When excessive writing is detected, the Outboard File Cache requests that the Data Processing System 10 destage segments before it writes more to Cache Storage 28. Step 332 builds destage request packets for inclusion in the Destage Request Table of the Status Packet 200. Step 334 sets the RECOMMENDED_ACTION in the Status Packet to "Destage Data and then Resend" and returns the Status Packet to the Data Processing System.

Returning to decision Step 248, if any of the segments specified in the Command Packet 196 are not present in Cache Storage 28, control is directed to decision Step 344 via Circle 342. Decision Step 344 tests the Residency Required (RR) flag in the Command Packet and directs control to Step 346 if the flag is set. Step 346 sets the RECOMMENDED_ACTION in the Status Packet 200 to "Allocate Space" and returns the Status Packet to the Data Processing System 10. Otherwise, control is directed to Step 348 for further processing.

Step 348 initializes the counters Segment-counter and Current-file-relative-segment-offset and processing proceeds to decision Step 350. If the segment in process is not in Cache Storage 28, File Descriptor 194 information is set up for the segment in Steps 354–358. Otherwise decision Step 350 directs control to Step 360. If the Resident file (XF) flag in the Command Packet is set and there is space available for allocation in Resident File Space 176, the current segment in Cache Storage is assigned to the segment in process at Step 354, otherwise, a segment in Cache File Space 172 is allocated.

Step 356 updates additional information in the File Descriptor 194. The FILE_IDENTIFIER and FILE_RELATIVE_SEGMENT_OFFSET in the File Descriptor are updated with the FILE_IDENTIFER from the Command Packet 196 and the Current-file-relative-segment-offset. The SEGMENT_DISABLED flag, NAIL flag, TOTAL_SEGMENT_VALID flag, SEGMENT_WRITTEN flag, and the BLOCKS_WRITTEN_TEMPLATE are cleared. The state of the File Descriptor is set to STAGE_PENDING, and the PROGRAM_ID and HOST_ID are updated with information from the Command Packet. Processing continues at Step 358 via control Path 356p.

If the Resident file (XF) flag in the Command Packet 196 is set, the Resident file (XF) flag in the File Descriptor 194 is set at Step 358. Otherwise, the XF flag in the File Descriptor is cleared.

Step 360 decrements the Segment-counter and increments the Current-file-relative-segment-offset. If there are more segments to process, decision Step 362 directs control to Step 350 via control Path 362n. Otherwise, processing proceeds to decision Step 364.

If decision Step 364 finds that the Resident file (XF) flag in the Command Packet 196 is not set, or decision Step 366 finds that all segments the segments were allocated in Resident File Space 176, control is directed to Step 368 where the RECOMMENDED_ACTION in the Status Packet 200 is set to "Stage Data" and the Status Packet is returned to the Data Processing System 10. In response to the "Stage Data" RECOMMENDED_ACTION, the Data Processing System 10 reads from the Disk 14 the segments identified by the Command Packet and issues a Stage Data Command Packet as described in the co-pending patent application. This aspect of the processing performed by the Data Processing System is not illustrated in the FIGs. in the interest of readability. If the Resident file (XF) flag in the Command Packet is set and not all of the segments were allocated in Resident File Space, control is directed to Step 370 where the RECOMMENDED_ACTION is set to "Stage Data and Log No Resident File Space Condition" and the Status Packet is returned to the Data Processing System.

Returning to FIG. 15A, if the SEGMENT_DISABLED flag in the File Descriptor 194 is set, the RECOMMENDED_ACTION in the Status Packet 200 is set to "Log the Condition Indicated by the Reason" and the REASON is set to "Segment Disabled". The Status Packet is returned to the Data Processing System 10.

If the state of the File Descriptor 194 is STAGE_PENDING as detected at Step 242, control is directed to Step 384 where the RECOMMENDED_ACTION in the Status Packet 200 is set to "Resend" and the Status Packet is returned to the Data Processing System.

If the Outboard File Cache 18 finds that any of the File Descriptors 194 have their SEGMENT_BUSY flags set, decision Step 250 directs control to Step 386 where the Block-level Scatter Write command is enqueued. The Outboard File Cache waits until the busy condition has passed and returns control to Step 222 via control Path 386p.

Having described an exemplary embodiment of the invention in the drawings and accompanying description, those skilled in the art will recognize that various modifications to the exemplary embodiment could be made without departing from the scope and spirit of the claims set forth below:

We claim:

1. In a transaction processing system operating on a data processing system for processing transactions against a database, a transaction audit and recovery system for auditing transactions to an audit file for database recovery, the database being comprised of a plurality of segments stored in disk storage, each segment of a predetermined fixed physical size, wherein reference by a transaction to a selectable portion of the database results in one or more of the plurality of segments being transferred from the disk storage to memory of the data processing system, and an update to a portion of a segment results in the entire segment being written to disk storage, the system comprising:

means for logically dividing a segment in memory which is updated by a transaction into a predetermined plurality of blocks, each block being comprised of a predetermined plurality of words of memory;

before-look means for obtaining a before-look version of said segment, wherein said before-look version of said segment contains data of said segment before said segment of the database was modified by the transaction;

identification means for identifying a set of changed blocks of said segment resulting from the transaction, wherein said set of changed blocks includes blocks of said segment that are different from corresponding ones of blocks in said before-look version of said segment; and block-level audit write means for writing said set of changed blocks in an audit record in the audit file.

2. The system of claim 1, further comprising:

recovery means for recovering the database after failure of the data processing system, wherein said recovery means comprises:

recovery read means for reading from the audit file an audit record having said set of changed blocks; and recovery write means for writing said set of changed blocks read from said audit record to a corresponding segment in the database.

3. The system of claim 1, further comprising:

template forming means for forming a template for said set of changed blocks, wherein said template identifies a position within said segment of each block in said set of changed blocks;

template write means for writing said template in said audit record; recovery means for recovering the database after failure of the data processing system, wherein said recovery means comprises:

recovery read means for reading from the audit file an audit record having said set of changed blocks; and recovery write means for writing said set of changed blocks read from said audit record to a corresponding segment in the database using said template to determine a position within said corresponding segment of each block in said set of changed blocks.

4. In a transaction processing system operating on a data processing system, wherein the data processing system is coupled to disk storage for storing a database and is coupled to an outboard file cache that provides cache storage of the database, and the database is stored in a plurality of segments on the disk storage, each segment of a predetermined fixed physical size, wherein reference by a transaction to a selectable portion of the database results in one or more of the plurality of segments being transferred from the disk storage to memory of the data processing system, a transaction audit and recovery system, comprising:

means for logically dividing a segment in memory which is updated by a transaction into a predetermined plurality of blocks, each block being comprised of a predetermined plurality of words of memory;

before-look means for obtaining from the outboard file cache a before-look version of said segment, wherein said before-look version of said segment contains data of said segment of the database before said segment of the database was modified by said transaction;

identification means for identifying a set of changed blocks of said segment resulting from the transaction, wherein said set of changed blocks includes blocks of said segment that are different from corresponding ones of blocks in said before-look version of said segment;

block-level audit write means for writing said set of changed blocks in an audit record;

template forming means for forming a template for said set of changed blocks, wherein said template identifies a position within said segment of each block of said set of changed blocks;

template writing means for writing said template in said audit record;

audit writing means for writing said audit record to an audit file;

recovery means for recovering said database after failure of the data processing system, wherein said recovery means comprises:

recovery read means for reading from the audit file an audit record having said template and said set of changed blocks; and block-level scatter write means for writing said set of changed blocks read from said audit record to a segment in the outboard file cache using said template to determine a position within said segment in the outboard file cache of each block in said set of changed blocks.

5. The system of claim 4, further comprising stage means for staging said segment of the database from disk storage to a segment in outboard file cache if said segment of the database is not present in the outboard file cache.

6. The system of claim 4, wherein said set of changed blocks is not written to the outboard file cache if the outboard file cache is unavailable and said recovery means further comprises:

test means for testing whether the outboard file cache is available;

disk read means for reading from the disk storage into memory of the data processing system said segment of the database if said outboard file cache is unavailable;

block-level write means for writing said set of changed blocks to said segment of the database in memory if the outboard file cache is unavailable; and disk write means for writing said segment of the database from memory to disk storage if the outboard file cache is unavailable.

7. The system of claim 5, further comprising stage means for staging said segment of the database from disk storage to a segment in the outboard file cache if said segment of the database is not present in the outboard file cache.

8. In a transaction processing system operating on a data processing system, wherein the data processing system is coupled to disk storage for storing a database and is coupled to an outboard file cache that provides cache storage of the database, and the database is stored in a plurality of segments on the disk storage, each segment of a predetermined fixed physical size, wherein reference by a transaction to a selectable portion of the database results in one or more of the plurality of segments being transferred from the disk storage to memory of the data processing system, a transaction audit and recovery system, comprising:

means for logically dividing a segment in memory which is updated by a transaction into a predetermined plurality of blocks, each block being comprised of a predetermined plurality of words of memory;

before-look means for obtaining from the outboard file cache a before-look version of said segment, wherein said before-look version of said segment contains data of said segment of the database before said segment of the database was modified by said transaction;

identification means for identifying a set of changed blocks of said segment resulting from the transaction, wherein said set of changed blocks includes blocks of said segment that are different from corresponding ones of blocks in said before-look version of said segment; and block-level audit write means for writing said set of changed blocks in an audit record;

template forming means for forming a template for said set of changed blocks, wherein said template identifies a position within said segment of each block of said set of changed blocks;

template writing means for writing said template in said audit record;

audit writing means for writing said audit record to an audit file;

recovery means for recovering said database after failure of the data processing system, wherein said recovery means comprises:

recovery read means for reading from the audit file an audit record having said template and said set of changed blocks;

command packet forming means for forming a command packet to issue to the outboard file cache, wherein said command packet contains a file-identifier, a segment-offset, said template, and a data location, wherein said file-identifier identifies a logical file name assigned by the data processing system, said segment-offset identifies a relative location of a segment within a file, and said data location indicates an address in the main storage of the data processing system;

issue means for issuing said command packet to the outboard file cache; and transfer means for transferring data from the memory of the data processing system to the outboard file cache according to said template and said data location.

9. The system of claim 11, wherein:

said audit writing means includes means for writing a plurality of audit records to the audit file when multiple transactions result in modifications to multiple segments of the database;

said command packet forming means includes means for including a plurality of templates in said command packet, wherein each of said plurality of templates corresponds to one and only one audit record, and means for specifying a plurality of segments of the database in said command packet; and the outboard file cache includes means for performing updates of each of said plurality of segments of the database that is stored in the outboard file cache as specified by said command packet.

10. In a transaction processing system operating on a data processing system, a computer implemented method for auditing transactions to an audit file for database recovery, the database being comprised of a plurality of segments stored in disk storage, each segment of a predetermined fixed physical size, wherein reference by the transaction processing system to a selectable portion of the database results in one or more of the plurality of segments being transferred from the disk storage to memory of the data processing system, and an update to a portion of a segment results in the entire segment being written to disk storage, the method comprising the steps of:

for a segment of the database in memory which is updated by a transaction, logically dividing said segment into a predetermined plurality of blocks, each block being comprised of a predetermined plurality of words of memory;

obtaining a before-look version of said segment;

identifying a set of changed blocks of said segment resulting from the transaction, wherein said set of changed blocks includes blocks of said segment that are different from corresponding ones of blocks in said before-look version of said segment; and writing said set of changed blocks in an audit record in the audit file.

11. The method of claim 10, further comprising the steps of:

performing steps (a)-(b) for recovering said database after failure of the data processing system;

(a) reading from the audit file an audit record having said set of changed blocks;

(b) writing said set of changed blocks read from said audit record to a corresponding segment in the database.

12. The method of claim 10, further comprising the steps of:

forming a template for said set of changed blocks, wherein said template identifies a position within said segment of each block in said set of changed blocks;

writing said template in said audit record;

performing steps (a)–(b) for recovering the database after failure of the data processing system;

(a) reading from the audit file an audit record having said set of changed blocks;

(b) writing said set of changed blocks read from said audit record to a corresponding segment in the database using said template to determine a position within said corresponding segment of each block in said set of changed blocks.

13. In a transaction processing audit and recovery system operating on a data processing system, wherein the data processing system is coupled to disk storage for storing a database and is coupled to an outboard file cache that provides cache storage of the database, and the database is stored in a plurality of segments on the disk storage, each segment of a predetermined fixed physical size, wherein reference by the transaction processing system to a selectable portion of the database results in one or more of the plurality of segments being transferred from the disk storage to memory of the data processing system, a computer implemented method for auditing transactions to an audit file for database recovery, comprising the steps of:

for a segment of the database in memory which is updated by a transaction, performing steps (a)–(g), (a) logically dividing said segment into a predetermined plurality of blocks, each block being comprised of a predetermined plurality of words of memory;

(b) obtaining from the outboard file cache a before-look version of said segment, wherein said before-look version of said segment contains data of said segment of the database before said segment of the database was modified by said transaction;

(c) identifying a set of changed blocks of said segment resulting from the transaction, wherein said set of changed blocks includes blocks of said segment that are different from corresponding ones of blocks in said before-look version of said segment;

(d) writing said set of changed blocks in an audit record;

(e) forming a template for said set of changed blocks, wherein said template identifies a position within said segment of each block of said set of changed blocks;

(f) writing said template in said audit record;

(g) writing said audit record to an audit file; performing steps (h)–(i) for recovering said database after failure of the data processing system;

(h) reading from the audit file an audit record having said template and said set of changed blocks; and (i) writing said set of changed blocks read from said audit record to a segment in the outboard file cache using said template to determine a position within said segment in the outboard file cache of each block in said set of changed blocks.

14. The method of claim 13, further comprising the steps of:

staging said segment of the database from disk storage to a segment in the outboard file cache if said segment of the database is not present in the outboard file cache.

15. The method of claim 13, wherein said set of changed blocks is not written to the outboard file cache if the outboard file cache is unavailable and recovering the database further comprises the steps of:

(j) testing whether the outboard file cache is available;

(k) reading from the disk storage into memory of the data processing system said segment of the database if said outboard file cache is unavailable;

(l) writing said set of changed blocks to said segment of the database in memory if the outboard file cache is unavailable; and (m) writing said segment of the database from memory to disk storage if the outboard file cache is unavailable.

16. The method of claim 15, further comprising the steps of:

if said segment of the database is not present in the outboard file cache, performing steps (n) and (o);

(n) staging said segment of the database from disk storage to a segment in the outboard file cache; and (o) writing after said staging step said set of changed blocks from said audit record to said segment in the outboard file cache using said template to determine a position within said segment in the outboard file cache of each block in said set of changed blocks.

17. In a transaction processing audit and recovery system operating on a data processing system, wherein the data processing system is coupled to disk storage for storing a database and is coupled to an outboard file cache that provides cache storage of the database, and the database is stored in a plurality of segments on the disk storage, each segment of a predetermined fixed physical size, wherein reference by the transaction processing system to a selectable portion of the database results in one or more of the plurality of segments being transferred from the disk storage to memory of the data processing system, a computer implemented method for auditing transactions to an audit file for database recovery, comprising the steps of:

for a segment of the database in memory which is updated by a transaction, performing steps (a)–(g), (a) logically dividing said segment into a predetermined plurality of blocks, each block being comprised of a predetermined plurality of words of memory;

(b) obtaining from the outboard file cache a before-look version of said segment, wherein said before-look version of said segment contains data of said segment of the database before said segment of the database was modified by said transaction;

(c) identifying a set of changed blocks of said segment resulting from the transaction, wherein said set of changed blocks includes blocks of said segment that are different from corresponding ones of blocks in said before-look version of said segment;

(d) writing said set of changed blocks in an audit record;

(e) forming a template for said set of changed blocks, wherein said template identifies a position within said segment of each block of said set of changed blocks;

(f) writing said template in said audit record;

(g) writing said audit record to the audit file;

performing steps (h)–(k) for recovering the database after failure of the data processing system;

(h) reading from the audit file an audit record having said template and said set of changed blocks;

(i) forming a command packet to issue to the outboard file cache for writing data to the outboard file cache, wherein said command packet contains a file-identifier, a segment-offset, said template, and a data location, wherein said file-identifier identifies a logical file name assigned by the data processing system, said segment-offset identifies a relative location of a segment within a file, and said data location indicates an address in the memory of the data processing system;

(j) issuing said command packet to the outboard file cache; and (k) transferring data from the memory of the data processing system to the outboard file cache according to said template and said data location.

18. The method of claim 17, further comprising the steps of:

(l) writing a plurality of audit records to the audit file according to steps (a) through (f) when multiple transactions result in modifications to multiple segments of the database;

(m) including a plurality of templates in said command packet, wherein each of said plurality of templates corresponds to one and only one audit record;

(n) specifying a plurality of segments of the database in said command packet; and (o) performing updates of each of said plurality of segments of the database that is stored in the outboard file cache as specified by said command packet.

19. In a transaction processing system operating on a data processing system, a computer implemented method for auditing transactions to an audit file for database recovery, the database being comprised of a plurality of segments stored in disk storage, each segment of a predetermined fixed physical size, wherein reference by the transaction processing system to a selectable portion of the database results in one or more of the plurality of segments being transferred from the disk storage to memory of the data processing system, and an update to a portion of a segment results in the entire segment being written to disk storage, the method comprising the steps of:

for a segment of the database which is in memory and updated by a transaction, performing steps (a)-(c);

(a) logically dividing said segment into a predetermined plurality of blocks, each block being comprised of a predetermined plurality of words of memory;

(b) identifying which blocks of said segment were updated as a result of the transaction; and (c) writing said set of changed blocks in an audit record in the audit file.

20. The method of claim 19, further comprising the steps of:

(d) performing steps (e)-(f) for recovering the database after failure of the data processing system;

(e) reading from the audit file an audit record having said set of changed blocks; and (f) writing said set of changed blocks to a corresponding segment in the database.

21. The method of claim 19, further comprising the steps of:

(d) forming a template for said set of changed blocks, wherein said template identifies a position within said segment of each block in said set of changed blocks;

(e) writing said template in said audit record;

(f) performing steps (g)-(h) for recovering said database after failure of the data processing system;

(g) reading from the audit file an audit record having said set of changed blocks; and (h) writing said set of changed blocks from said audit record to a corresponding segment in the database using said template to determine a position within said corresponding segment of each block in said set of changed blocks.

* * * * *

UNITED STATES PATENT AND TRADEMARK OFFICE
CERTIFICATE OF CORRECTION

PATENT NO. : 5,682,527
DATED : October 28, 1997
INVENTOR(S) : Thomas P. Cooper et al It is certified that error appears in the above-identified patent and that said Letters Patent is hereby corrected as shown below:

Column 20, Line 14  Delete "11" replace with "8".

Signed and Sealed this

Tenth Day of February, 1998

Attest:

BRUCE LEHMAN

Attesting Officer

Commissioner of Patents and Trademarks